United States Patent
Fujishiro et al.

(10) Patent No.: US 10,779,129 B2
(45) Date of Patent: Sep. 15, 2020

(54) COMMUNICATION APPARATUS, BASE STATION, AND NETWORK APPARATUS

(71) Applicant: KYOCERA Corporation, Kyoto (JP)

(72) Inventors: Masato Fujishiro, Yokohama (JP); Chiharu Yamazaki, Tokyo (JP); Mayumi Komura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/324,524

(22) PCT Filed: Aug. 8, 2017

(86) PCT No.: PCT/JP2017/028717
§ 371 (c)(1),
(2) Date: Feb. 8, 2019

(87) PCT Pub. No.: WO2018/030385
PCT Pub. Date: Feb. 15, 2018

(65) Prior Publication Data
US 2019/0174271 A1  Jun. 6, 2019

(30) Foreign Application Priority Data

Aug. 10, 2016  (JP) ................. 2016-157797
Aug. 10, 2016  (JP) ................. 2016-157809

(51) Int. Cl.
H04W 4/06 (2009.01)
H04W 4/02 (2018.01)
(Continued)

(52) U.S. Cl.
CPC ............ H04W 4/06 (2013.01); H04W 4/02 (2013.01); H04W 4/025 (2013.01); H04W 8/08 (2013.01);
(Continued)

(58) Field of Classification Search
None
See application file for complete search history.

(56) References Cited

U.S. PATENT DOCUMENTS

2016/0165413 A1   6/2016 Bhalla
2018/0324560 A1*  11/2018 Xu ..................... H04W 4/06
2019/0104386 A1*  4/2019  Kim ................... H04W 76/00

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN); Overall Description; Stage 2"; 3GPP TS 36.300; V13.4.0; Jun. 2016; pp. 1-310; Release 13; 3GPP Organizational Partners.

(Continued)

Primary Examiner — Yaotang Wang
(74) Attorney, Agent, or Firm — Studebaker & Brackett PC

(57) ABSTRACT

A communication apparatus according to one embodiment includes a receiver configured to receive predetermined information from a base station. The predetermined information indicates a corresponding relationship between identification information for identifying multicast data and area identification information for identifying a geographical area. The receiver is configured to receive predetermined multicast data from the base station based on the predetermined information. The predetermined multicast data includes data from another communication apparatus in a first area in which the communication apparatus is located.

12 Claims, 25 Drawing Sheets

(51) Int. Cl.
    *H04W 76/27*     (2018.01)
    *H04W 8/08*     (2009.01)
    *H04W 64/00*     (2009.01)
    *H04W 88/08*     (2009.01)
    *H04W 88/16*     (2009.01)
    *H04W 88/18*     (2009.01)

(52) U.S. Cl.
    CPC ......... *H04W 64/003* (2013.01); *H04W 76/27* (2018.02); *H04W 88/08* (2013.01); *H04W 88/16* (2013.01); *H04W 88/184* (2013.01)

(56) References Cited

OTHER PUBLICATIONS

Huawei; "[75#35]—LTE: MBMS Service Continuity"; 3GPP TSG RAN WG2 #75bis; R2-115017; Oct. 10-14, 2011; Zhuhai, China.

\* cited by examiner

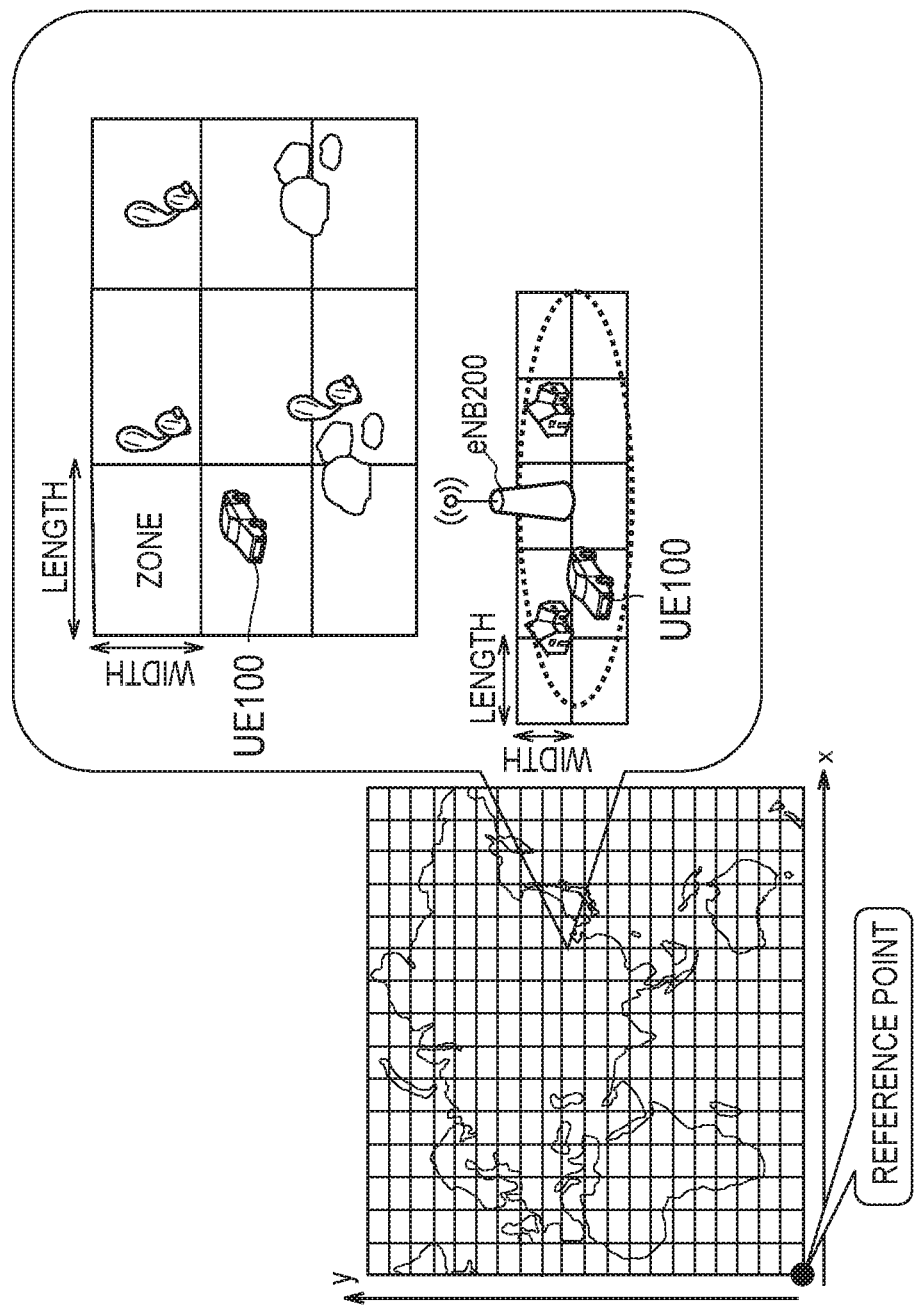

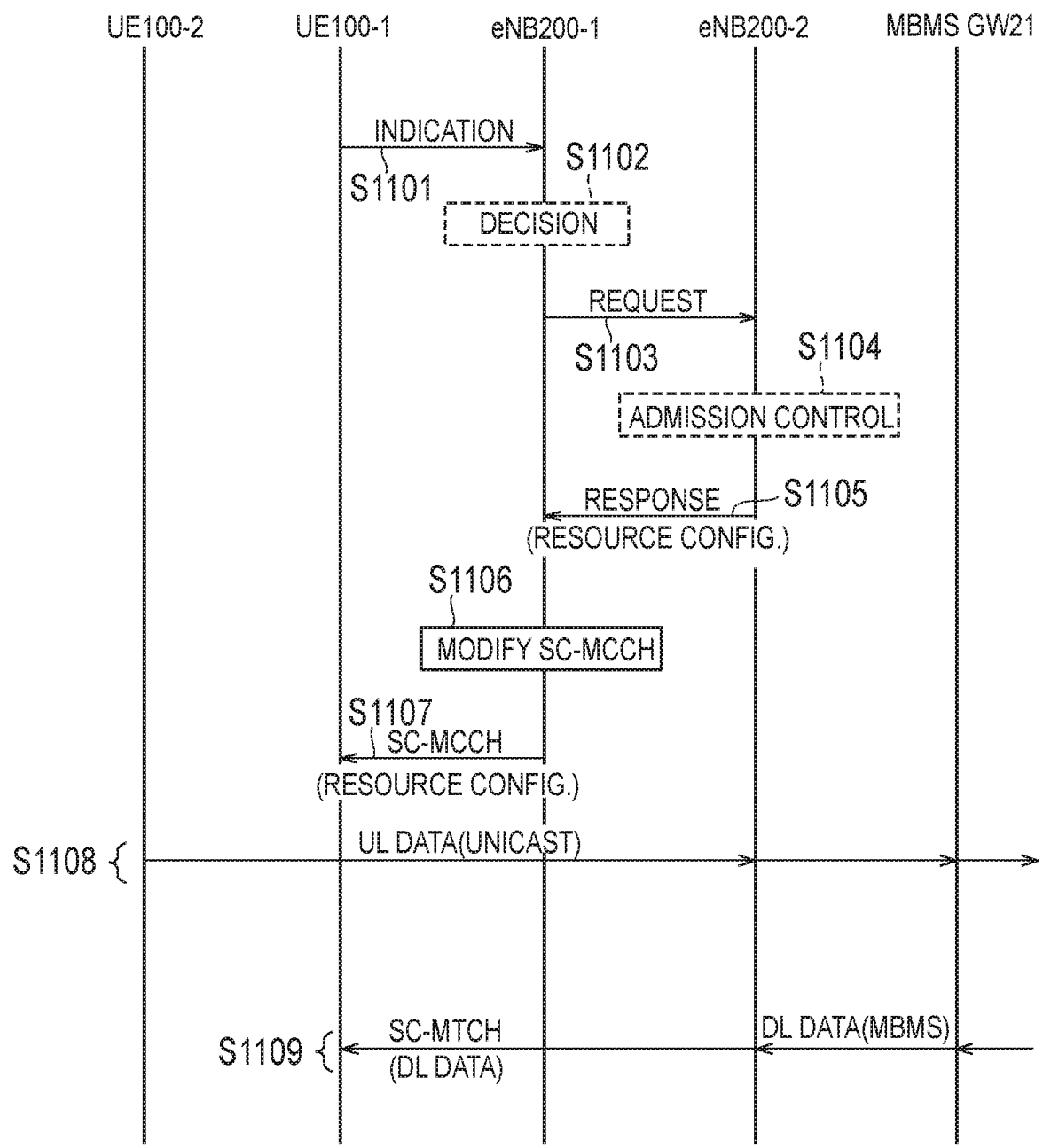

FIG. 21

MBMSInterestIndication message

```
-- ASN1START

MBMSInterestIndication-r11 ::=      SEQUENCE {
    criticalExtensions                  CHOICE {
        c1                                  CHOICE {
            interestIndication-r11              MBMSInterestIndication-r11-IEs,
            spare3 NULL, spare2 NULL, spare1 NULL
        },
        criticalExtensionsFuture            SEQUENCE {}
    }
}

MBMSInterestIndication-r11-IEs ::=  SEQUENCE {
    mbms-FreqList-r11                   CarrierFreqListMBMS-r11
    OPTIONAL,
    mbms-Priority-r11                   ENUMERATED {true}
    OPTIONAL,
    lateNonCriticalExtension            OCTET STRING
    OPTIONAL,
    nonCriticalExtension                MBMSInterestIndication-v1310-IEs
    OPTIONAL
}

MBMSInterestIndication-v1310-IEs ::= SEQUENCE {
    mbms-Services-r13                   MBMS-ServiceList-r13
    OPTIONAL,
    nonCriticalExtension                SEQUENCE {}
    OPTIONAL
}

-- ASN1STOP
```

MBMS-ServiceList information element

```
-- ASN1START

MBMS-ServiceList-r13 ::=            SEQUENCE (SIZE (0..maxMBMS-
ServiceListPerUE-r13)) OF MBMS-ServiceInfo-r13

MBMS-ServiceInfo-r13 ::=            SEQUENCE    {
    tmgi-r13                            TMGI-r9,
    zoneId-r14                          INTEGER
}

-- ASN1STOP
```

COMMUNICATION APPARATUS, BASE STATION, AND NETWORK APPARATUS

TECHNICAL FIELD

The present disclosure relates to a communication apparatus, a base station, and a network apparatus.

BACKGROUND ART

In 3GPP (3rd Generation Partnership Project) which is a project aiming to standardize a mobile communication system, specifications for direct signaling (Sidelink) between terminals are being prepared (see Non Patent Document 1).

PRIOR ART DOCUMENT

Non-Patent Document

Non Patent Document 1: 3GPP Technical Specification "TS 36.300 V13.4.0", Jul. 7, 2016

SUMMARY OF THE INVENTION

A communication apparatus according to one embodiment comprises a receiver configured to receive predetermined information from a base station. The predetermined information indicates a corresponding relationship between identification information for identifying multicast data and area identification information for identifying a geographical area. The receiver is configured to receive, based on the predetermined information, predetermined multicast data from the base station. The predetermined multicast data includes data from another communication apparatus in a first area in which the communication apparatus is located.

A base station according to one embodiment comprise a transmitter configured to transmit predetermined information to a first communication apparatus. The predetermined information indicates a corresponding relationship between identification information for identifying multicast data and area identification information for identifying a geographical area. The transmitter is configured to transmit predetermined multicast data based on the predetermined information.

A base station according to one embodiment comprises a controller. The controller performs a process of sending a message to another base station or an upper node. The message may be a message requesting multicasting of the data from a first communication apparatus to a specific area by the other base station.

A base station according to one embodiment comprises a controller. The controller may perform a process of sending to another base station or an upper node, a message requesting the transfer of data from a first communication apparatus controlled by the another base station. The base station further comprise a transmitter configured to transmit the data as multicast data to a specific area.

A network apparatus according to one embodiment comprise a controller. The controller is configured to perform a process of receiving a first message from a first base station. The first message is a message requesting multicasting of the data from a communication apparatus to a specific area by a second base station. The controller is configured to perform a process of sending a second message to an upper node based on the first message. The second message is a message requesting the start of multicasting by the second base station.

BRIEF DESCRIPTION OF THE DRAWINGS

FIG. 6 is a diagram for describing an example of a zone.

FIG. 20 is a sequence chart for describing an operation pattern 1 according to the second embodiment.

FIG. 21 is a diagram for describing an example of a message according to the second embodiment.

DESCRIPTION OF THE EMBODIMENT

Overview of Embodiment

Figure 1:
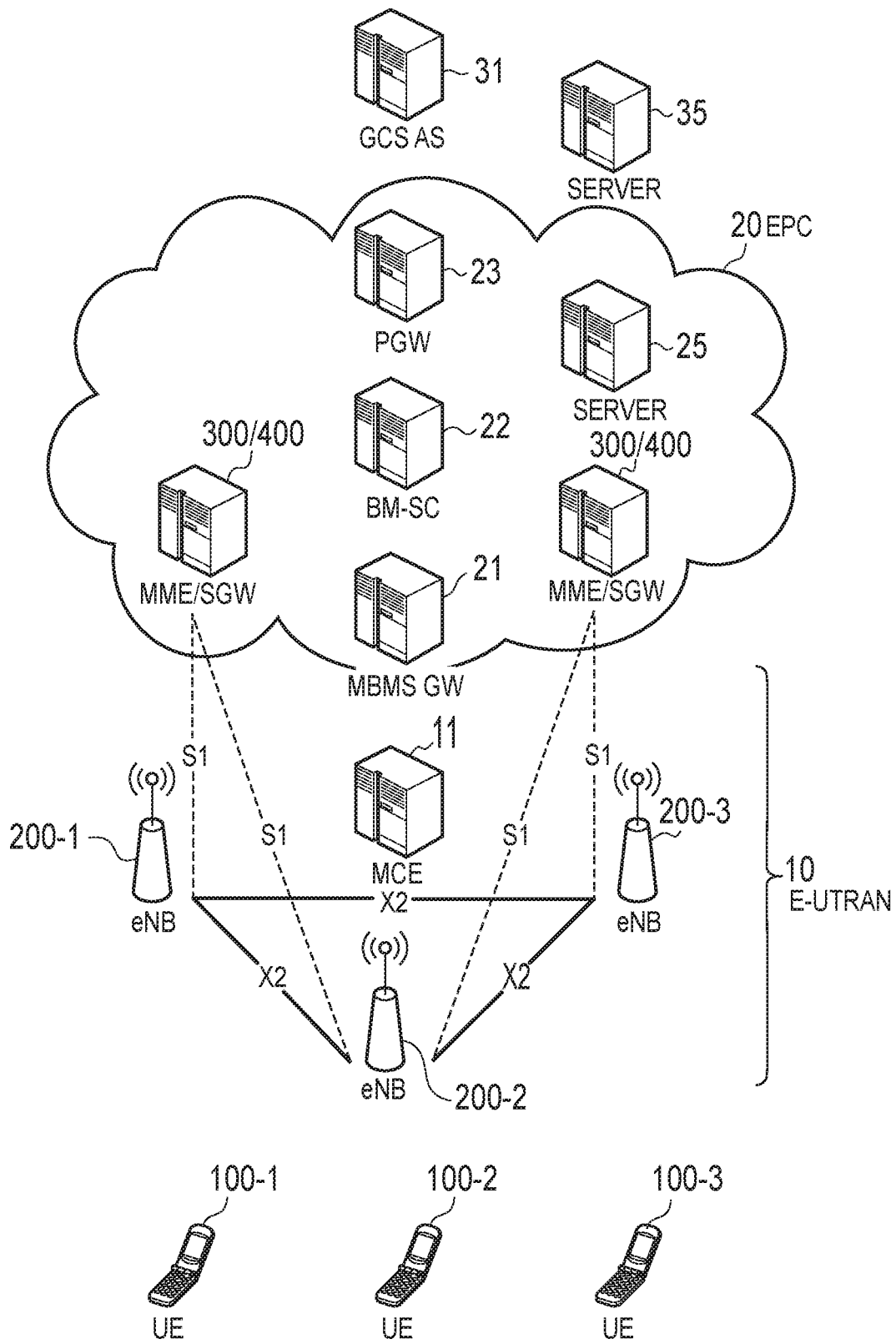
FIG. 1 is a diagram illustrating a configuration of an LTE system.

In recent years, the introduction of Vehicle-to-Vehicle (V2V) communication using a side link (Sidelink) is being examined. On the other hand, as one form of Vehicle-to-Vehicle communication, it is also being examined that a first communication apparatus provided in a vehicle sends information to a second communication apparatus provided in a neighboring vehicle via a base station.

Here, it is assumed that in order to send a message to all communication apparatuses located in the vicinity (periphery) of the first communication apparatus, the base station transmits information (message) from the first communication apparatus by broadcast/multicast. However, there is a possibility that the second communication apparatus must also receive information from a communication apparatus far away from the second communication apparatus. As a result, the load on the second communication apparatus (the receiving side) may increase.

A communication apparatus according to one embodiment comprises a receiver configured to receive predetermined information from a base station. The predetermined information indicates a corresponding relationship between identification information for identifying multicast data and area identification information for identifying a geographical area. The receiver, based on the predetermined information, receives predetermined multicast data from the base station. The predetermined multicast data includes data from another communication apparatus in a first area in which the communication apparatus is located.

The communication apparatus may comprise a controller configured to specify predetermined area identification information for identifying the first area. The controller may specify, based on the predetermined information, predetermined identification information associated with the predetermined area identification information. The receiver may receive, based on the predetermined identification information, the predetermined multicast data.

The predetermined multicast data may include data from a third communication apparatus in a second area different from the first area.

The communication apparatus may further comprise a transmitter configured to transmit first information to the base station. The first information may be information intending to have the base station transmit the predetermined multicast data including data from another communication apparatus in a second area different from the first area.

The communication apparatus may further comprise a transmitter configured to transmit first information to the base station. The first information may be information intending to have the base station transmit multicast data including data from the communication apparatus in a second area different from the first area.

The communication apparatus may further include a controller configured to decide the second area. The controller may decide the second area in accordance with at least any one of a position of the communication apparatus, a moving speed of the communication apparatus, and a movement direction of the communication apparatus.

The transmitter may transmit the first information in response to the fulfillment of a transmission condition of the first information. The transmission condition may be a condition based on at least any one of a distance from a location of the communication apparatus to a boundary of the first area, a time taken for the communication apparatus to reach the boundary of the first area, and the second area being a specific area.

The transmitter may transmit second information to the base station. The second information may be information indicating that there is no need to transmit the predetermined multicast data including the data from the other communication apparatus.

The transmitter may transmit second information to the base station. The second information may be information indicating that there is no need to transmit the multicast data including the data from the communication apparatus in the second area.

The receiver may receive definition information for defining the area identification information from the base station. The communication apparatus may further comprise a transmitter configured to notify the definition information to a network apparatus configured to decide at least one of a first corresponding relationship and a second corresponding relationship. The first corresponding relationship may be a corresponding relationship between the identification information and the area identification information. The second corresponding relationship may be a corresponding relationship between the identification information and data to be transmitted as the multicast data.

A base station according to one embodiment comprise a transmitter configured to transmit predetermined information to a first communication apparatus. The predetermined information indicates a corresponding relationship between identification information for identifying multicast data and area identification information for identifying a geographical area. The transmitter is configured to transmit predetermined multicast data based on the predetermined information.

The base station may further comprise a receiver configured to receive data from a second communication apparatus. The predetermined multicast data may include data from the second communication apparatus, and is identified by predetermined identification information. The predetermined identification information may be associated with predetermined area identification information for identifying an area in which the second communication apparatus is located.

The base station may further comprise a receiver configured to receive first information from the first communication apparatus. The first information may be information intending to have the base station transmit the predetermined multicast data including data from another communication apparatus in a second area different from a first area in which the first communication apparatus is located.

The base station may further comprise a receiver configured to receive first information from the first communication apparatus. The first information may be information intending to have the base station transmit multicast data including data from the first communication apparatus in a second area different from a first area in which the first communication apparatus is located.

The transmitter may transmit a transmission condition of the first information to the first communication apparatus. The transmission condition may be a condition based on at least any one of a distance from a location of the communication apparatus to a boundary of the first area, a time taken for the communication apparatus to reach the boundary of the first area, and the second area being a specific area.

The base station may further comprise a controller configured to notify definition information for defining the area identification information to a network apparatus configured to decide at least one of a first corresponding relationship and a second corresponding relationship. The first corresponding relationship may be a corresponding relationship between the identification information and the area identification information. The second corresponding relationship may be a corresponding relationship between the identification information and data to be transmitted as the multicast data.

A base station according to one embodiment comprises a controller. The controller performs a process of sending a message to another base station or an upper node. The message may be a message requesting multicasting of the data from the first communication apparatus to a specific area by the other base station.

The base station may further comprise a receiver configured to receive location information of the first communication apparatus from the first communication apparatus. The controller may perform the sending process based on the location information.

The base station may further comprise a receiver configured to receive, from the first communication apparatus, information indicating an interest in the specific area. The controller may perform the sending process based on the information.

The base station may further comprise a transmitter configured to transmit information about a geographical area defined by the other base station to the first communication apparatus.

The message may include location information of the first communication apparatus.

The controller may perform a process of receiving a response message to the message. The response message may include address information indicating a transfer destination of the data. The controller may perform a process of transferring the data as multicast data to the other base station based on the address information.

The controller may perform a process of receiving a response message to the message. The response message may include information about a resource allocated by the other base station for transmission of multicast data. The base station may further comprise a transmitter configured to transmit the information about the resource to a second communication apparatus controlled by the base station.

A base station according to one embodiment comprises a controller. The controller may perform a process of sending a message to another base station or an upper node. The message may be a message requesting the transfer of data from a first communication apparatus controlled by the other base station. The base station may further comprise a transmitter configured to transmit the data as multicast data to a specific area.

The controller may perform a process of receiving information about a resource allocated for transmitting the multicast data from the upper node. The transmitter may transmit the information about the resource to a second communication apparatus controlled by the base station.

A network apparatus according to one embodiment comprise a controller. The controller may perform a process of receiving a first message from a first base station and a process of sending a second message to an upper node based on the first message. The first message may be a message requesting multicasting of the data from a communication apparatus to a specific area by a second base station. The second message may be a message requesting the start of multicasting by the second base station.

First Embodiment (Mobile Communication System)

Hereinafter, an LTE system which is a mobile communication system according to the first embodiment will be described. FIG. 1 is a diagram illustrating a configuration of an LTE system.

As illustrated in FIG. 1, the LTE system includes UE (User Equipment) 100, Evolved Universal Terrestrial Radio Access Network (E-UTRAN) 10, and Evolved Packet Core (EPC) 20.

The UE 100 corresponds to a communication apparatus (for example, a radio terminal). The UE 100 is a mobile communication apparatus. The UE 100 may be a vehicle (VUE (Vehicle UE) 100) having a communication function. Therefore, the UE 100 may be the vehicle itself (e.g., a car, a motorcycle, etc.). The UE 100 may be a communication module detachable from the vehicle.

The UE 100 performs radio communication (Uplink/Downlink) with a cell (eNB 200 to be described later). UE 100 may be able to perform direct signaling transmission and/or reception with other communication apparatuses. For example, the UE 100 may be able to perform V2X (Vehicle-to-Everything) communication (e.g., V2V: Vehicle-to-Vehicle), road-to-vehicle communication (V2I: Vehicle-to-Infrastructure).

The E-UTRAN 10 corresponds to a radio access network. The E-UTRAN 10 includes eNBs (evolved Node-Bs) 200. The eNBs 200 correspond to base stations. The eNBs 200 are connected to each other via an X2 interface. The operation of the eNB 200 may be regarded as the operation of the E-UTRAN 10.

The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter may be referred to as "data"), a measurement control function for mobility control/scheduling, and the like. "Cell" is used as a term indicating the minimum unit of radio communication area. The "cell" may also be used as a term indicating a function of performing radio communication with the UE 100.

The EPC 20 corresponds to a core network. The EPC 20 may constitute a network (network of an LTE system) together with the E-UTRAN 10. The EPC 20 includes a PGW (Packet Data Network Gateway) 23, an MME (Mobility Management Entity) 300, and an SGW (Serving-Gateway) 400.

The PGW 23 is configured to perform control to relay user data from an external network (and to an external network). The MME 300 is, for example, configured to perform various types of mobility control for the UE 100. The SGW 400 is, for example, configured to perform transfer control of data. The MME 300 and the SGW 400 are connected to the eNB 200 via an S1 interface.

Figure 2:
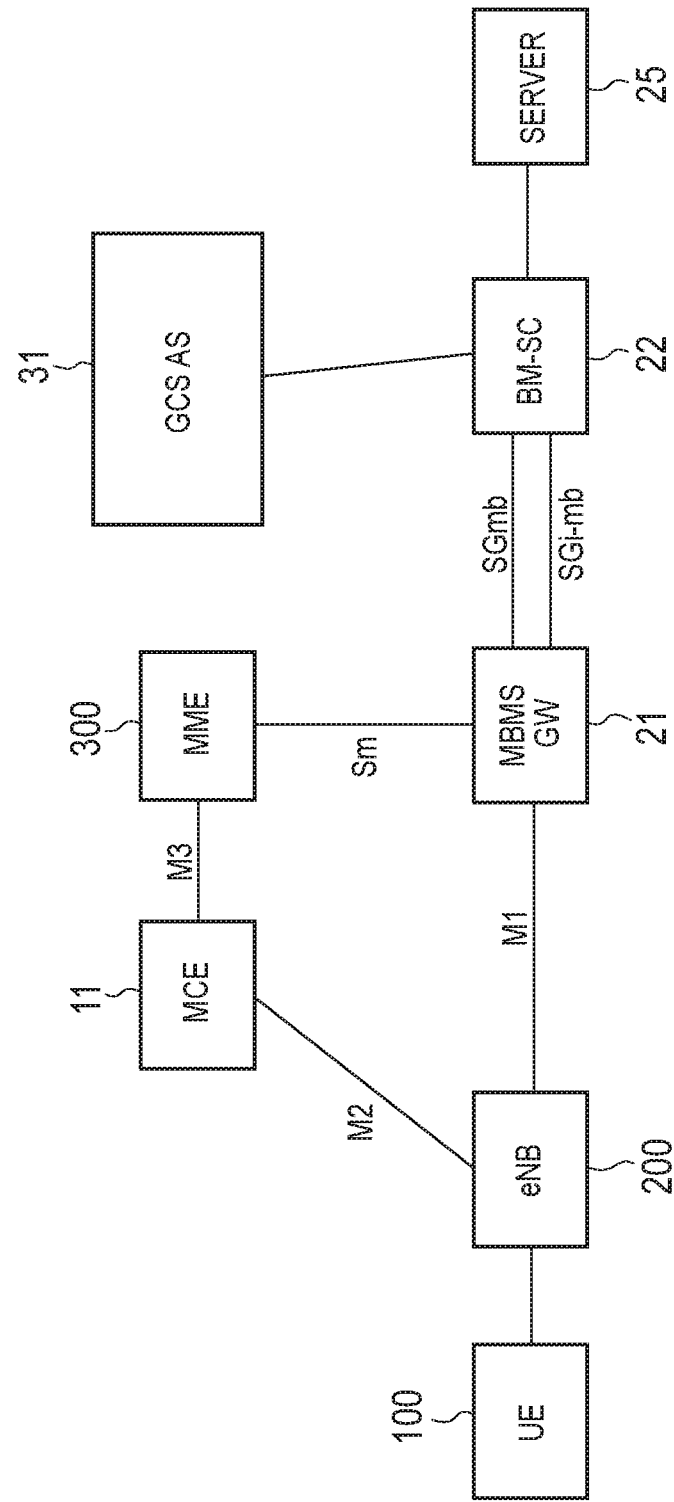
FIG. 2 is a diagram illustrating a network configuration related to MBMS.

The EPC 20 includes an MCE (Multi-Cell/Multicast Coordinating Entity) 11. The MCE 11 is connected to the eNB 200 via an M2 interface (see FIG. 2). The MCE 11 is connected to the MME 300 via an M3 interface. The M2 interface is an E-UTRAN internal control plane interface. The M3 interface is a control plane interface between the E-UTRAN 10 and the EPC 20.

The MCE 11 may be provided in the eNB 200. The eNB 200 may have a function of the MCE 11. Therefore, the eNB 200 may perform an operation of the MCE 11. In this case, the MME 300 is connected to (the MCE 11 of) the eNB 200 via the M3 interface.

The MCE 11 may have a function of performing allocation and admission control of radio resources used by all the eNBs 200 in an MBSFN area for multicell MBMS (Multimedia Broadcast Multicast Service) transmission using an MBSFN (Multimedia Broadcast multicast service Single Frequency Network) operation. Specifically, the MCE 11 may perform scheduling of MBSFN transmission. On the other hand, the scheduling of the SC-PTM (Single Cell Point To Multiplot) transmission may be performed by the eNB 200.

The EPC 20 includes an MBMS GW (MBMS Gateway) 21. The MBMS GW 21 is connected to the eNB 200 via an M1 interface (see FIG. 2). The M1 interface is a user plane interface. The MBMS GW 21 is connected to the MME 300 via an Sm interface. The MBMS GW 21 is connected to the BM-SC 22 via an SG-mb and an SGi-mb interface.

The MBMS GW 21 has a function of sending/broadcasting MBMS packets to each eNB 200 configured to transmit the MBMS service. The MBMS GW 21 uses IP multicast as a means for transferring the MBMS user data to an eNB 200. The MBMS GW 21 is configured to perform MBMS session control signaling (session start/update/stop) to the E-UTRAN 10 via the MME 300.

The EPC 20 includes a BM-SC (Broadcast Multicast Service Center) 22. The BM-SC 22 is connected to the MBMS GW 21 via the SG-mb and the SGi-mb interfaces (see FIG. 2). The BM-SC 22 is connected to the PGW 23 via an SGi interface. The BM-SC 22 is configured to perform management, allocation and the like of a TMGI (Temporary Mobile Group Identity).

The EPC 20 may include a Server 25 configured to provide the contents. The Server 25 may be connected to the BM-SC 22 via a predetermined interface.

A GCS AS (Group Communication Service Application Server) 31 may be provided in an external network (that is, the Internet) of the EPC 20. The GCS AS 31 is an application server for group communication. The GCS AS 31 is connected to the BM-SC 22 via an MB 2-U and an MB 2-C interface. The GCS AS 31 is connected to the P-GW 23 via the SGi interface. The GCS AS 31 is configured to perform management of groups in group communication, and data distribution, etc.

A Server 35 may be provided in an external network (that is, the Internet) of the EPC 20. The Server 35 may be, for example, a ProSe server configured to manage the ProSe function. The Server 35 may be a V2X server configured to manage the V2X (V2V/V2I) function.

Figure 3:
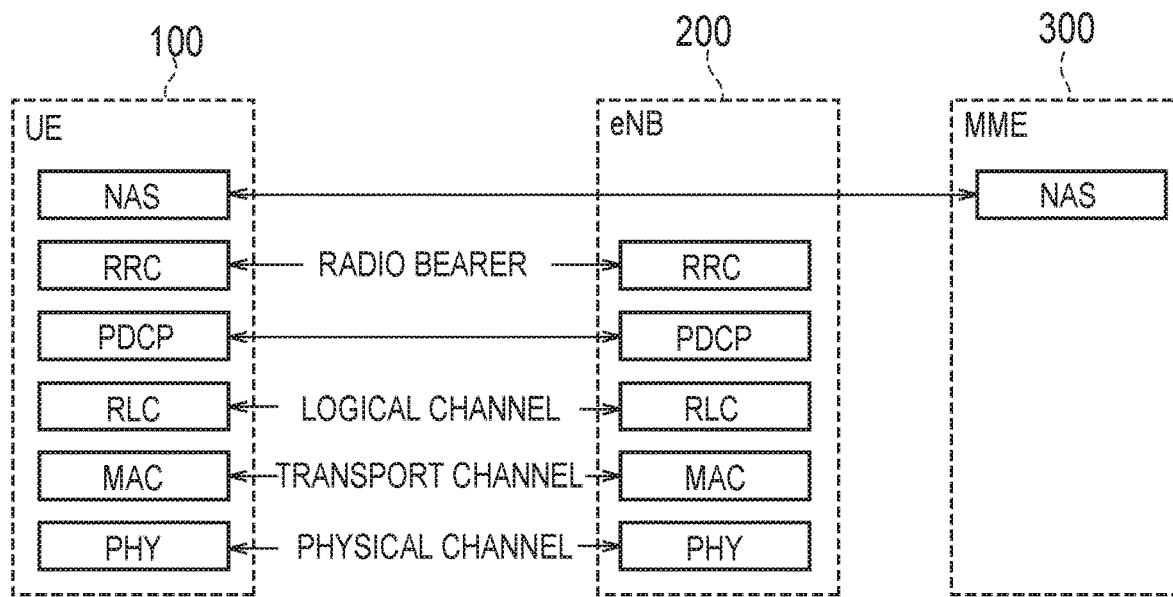
FIG. 3 is a diagram illustrating a protocol stack of a radio interface in the LTE system.

FIG. 3 is a diagram illustrating a protocol stack of a radio interface in the LTE system. As illustrated in FIG. 3, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control signals are transmitted via the physical channel.

The MAC layer performs priority control of data, retransmission processing by Hybrid Automatic Repeat reQuest (HARQ), random access procedure, and the like. Between the MAC layer of the UE 100 and the MAC layer of the eNB 200, data and control signals are transmitted via the transport channel. The MAC layer of the eNB 200 includes a scheduler (MAC scheduler). The scheduler determines transport formats (transport block size, modulation and coding scheme (MCS)) of uplink and downlink and allocated resource blocks to UE 100.

The RLC layer uses the functions of the MAC layer and the physical layer to transmit data to the RLC layer on the receiving side. Between the RLC layer of the UE 100 and the RLC layer of the eNB 200, data and control signals are transmitted via logical channels.

The PDCP layer carries out header compression/decompression, encryption/decryption.

The RRC layer is defined only in the control plane handling the control signal. Messages (RRC messages) for various settings is transmitted between the RRC layer of the UE 100 and the RRC layer of the eNB 200. The RRC layer controls logical channels, transport channels, and physical channels in response to establishment, re-establishment and release of radio bearers. If there is an RRC connection between the RRC of the UE 100 and the RRC of the eNB 200, the UE 100 is in the RRC connected state. If there is no RRC connection between the RRC of the UE 100 and the RRC of the eNB 200, the UE 100 is in the RRC idle state.

The NAS (Non-Access Stratum) layer located above the RRC layer performs, for example, session management and mobility management.

Figure 4:
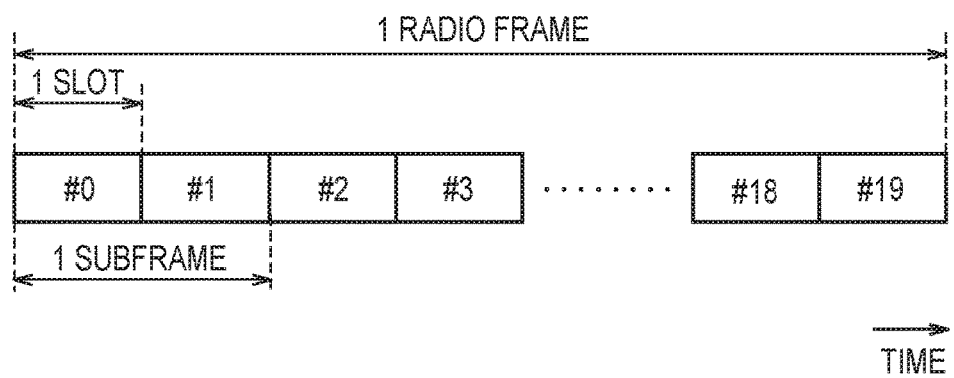
FIG. 4 is a diagram illustrating a configuration of a radio frame of the LTE system.

FIG. 4 is a diagram illustrating a configuration of a radio frame of the LTE system. In the LTE system, OFDMA (Orthogonal Frequency Division Multiple Access) is applied to the downlink. SC-FDMA (Single Carrier Frequency Division Multiple Access) is applied to the uplink.

As shown in FIG. 4, the radio frame is composed of ten subframes arranged in the time direction. Each subframe is composed of two slots aligned in the time direction. The length of each subframe is 1 ms. The length of each slot is 0.5 ms. Each subframe includes a plurality of resource blocks (RBs) in the frequency direction. Each subframe includes a plurality of symbols in the time direction. Each resource block includes a plurality of subcarriers in the frequency direction. One resource element (RE: Resource Element) is composed of one symbol and one subcarrier. A radio resource (time/frequency resource) is allocated to the UE 100. In the frequency direction, radio resources (frequency resources) are configured by resource blocks. In the time direction, radio resources (time resources) are configured by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are portions usable as a Physical Uplink Control Channel (PUCCH) for transmitting an uplink control signal. The remaining part of each subframe is an area that can be used as a physical uplink shared channel (PUSCH) for transmitting uplink data.

(Channel Configuration of Downlink)

Figure 5A:
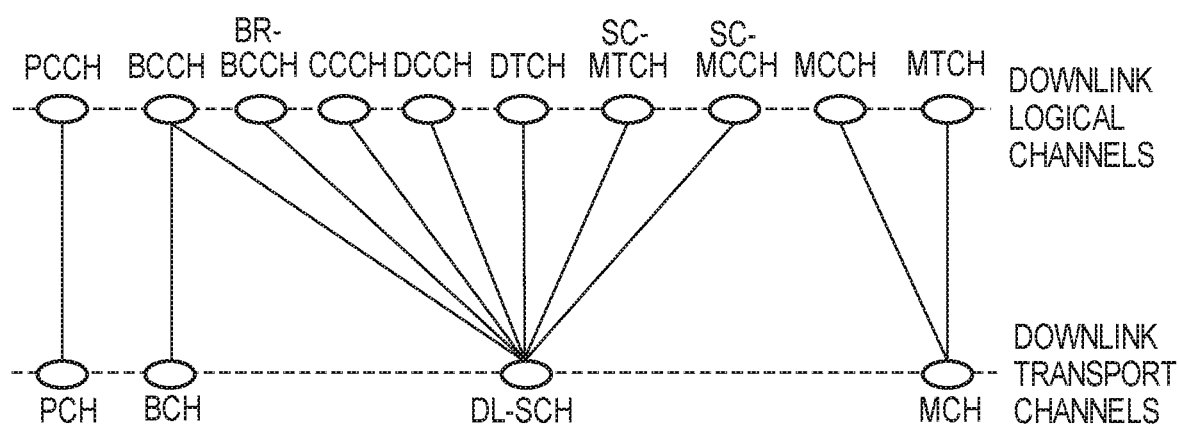
FIG. 5 is a diagram illustrating a channel configuration of downlink of the LTE system.
Figure 5B:
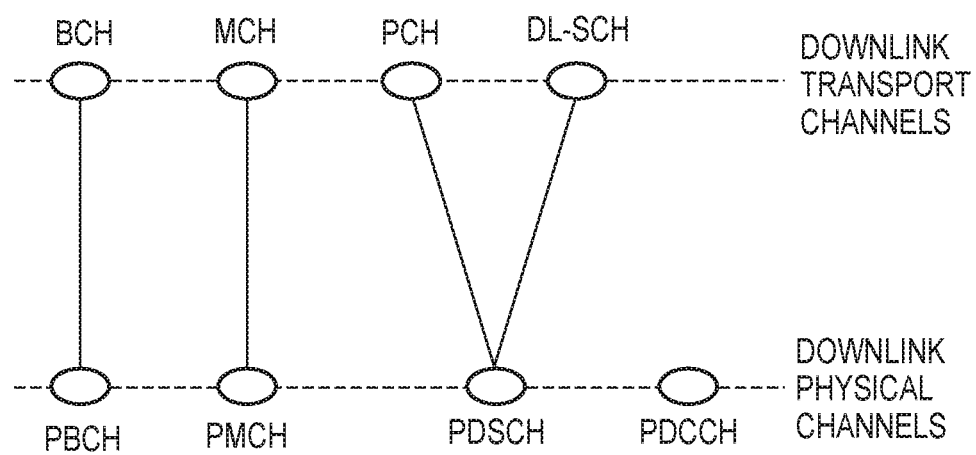

FIG. 5 is a diagram illustrating a channel configuration of downlink of the LTE system.

FIG. 5(a) illustrates mapping between a logical channel (Downlink Logical Channel) and a transport channel (Downlink Transport Channel).

As illustrated in FIG. 5(a), a PCCH (Paging Control Channel) is a logical channel for notifying a paging information and system information change. The PCCH is mapped to a PCH (Paging Channel) that is a transport channel.

A BCCH (Broadcast Control Channel) is a logical channel for system information. The BCCH is mapped to a BCH (Broadcast Control Channel) and a DL-SCH (Downlink Shared Channel), both of which are transport channels.

A BR-BCCH (Bandwidth Reduced Broadcast Control Channel) is a logical channel for broadcasting system control information. The BR-BCCH is mapped to the DL-SCH.

A CCCH (Common Control Channel) is a logical channel for transmission control information between a UE 100 and an eNB 200. The CCCH is used if the UE 100 does not have an RRC connection with the network. The CCCH is mapped to the DL-SCH.

A DCCH (Dedicated Control Channel) is a logical channel for transmitting individual control information between a UE 100 and the network. The DCCH is used if the UE 100 has an RRC connection. The DCCH is mapped to the DL-SCH.

A DTCH (Dedicated Traffic Channel) is an individual logical channel for data transmission. The DTCH is mapped to the DL-SCH.

An SC-MTCH (Single Cell Multicast Traffic Channel) is a logical channel for SC-PTM transmission. The SC-MTCH is a point-to-multipoint downlink channel for transmitting data from the network to a UE 100 by using the SC-PTM transmission.

An SC-MCCH (Single Cell Multicast Control Channel) is a logical channel for SC-PTM transmission. The SC-MCCH is a point-to-multipoint downlink channel for transmitting MBMS control information for one or a plurality of SC-MTCHs from the network to a UE 100. The SC-MCCH is used only for a UE 100 that either receives or is interested in receiving an MBMS by using the SC-PTM. There is only one SC-MCCH in one cell.

An MCCH (Multicast Control Channel) is a logical channel for MBSFN transmission. The MCCH is used for transmitting MBMS control information for an MTCH from the network to a UE 100. The MCCH is mapped to an MCH (Multicast Channel) that is a transport channel.

An MTCH (Multicast Traffic Channel) is a logical channel for MBSFN transmission. The MTCH is mapped to the MCH.

FIG. 5(*b*) illustrates mapping between a transport channel (Downlink Transport Channel) and a physical channel (Downlink Physical Channel).

As illustrated in FIG. 5(*b*), the BCH is mapped to a PBCH (Physical Broadcast channel).

The MCH is mapped to a PMCH (Physical Multicast Channel). The MCH supports MBSFN transmission by a plurality of cells.

The PCH and the DL-SCH are mapped to a PDSCH (Physical Downlink Shared Channel). The DL-SCH supports HARQ, a link adaptation, and a dynamic resource allocation.

A PDCCH carries resource allocation information of the PDSCH (DL-SCH, PCH), HARQ information on the DL-SCH, and the like. Further, the PDCCH carries an uplink scheduling grant.

(Zone Concept)

The zone concept will be described with reference to FIG. 6. FIG. 6 is a diagram for describing an example of a zone.

In the zone concept, as illustrated in FIG. 6, the world is divided into geographical zones. A UE 100 that is in coverage may receive information (zone definition information) for defining a zone (zone identification information) from the eNB 200. The information (zone definition information) set in advance is applied to a UE 100 that is out-of-coverage. The zone definition information defines, for example, a length of the zone, a width of the zone, and a single fixed reference point.

The UE 100 decides the zone in which the UE 100 is located based on the zone definition information. That is, the UE 100 decides the zone in which the UE 100 is located. The UE 100 can decide the zone by a modulo operation. The UE 100 can decide the zone by using a reference point (for example, (0, 0)).

The zone is different from a coverage of the cell. The cell corresponds to a reachable range of a radio signal of the eNB 200. On the other hand, the zone is, for example, a geographical section decided (defined) by a network (the eNB 200 or the like).

(Radio Terminal)

Figure 7:
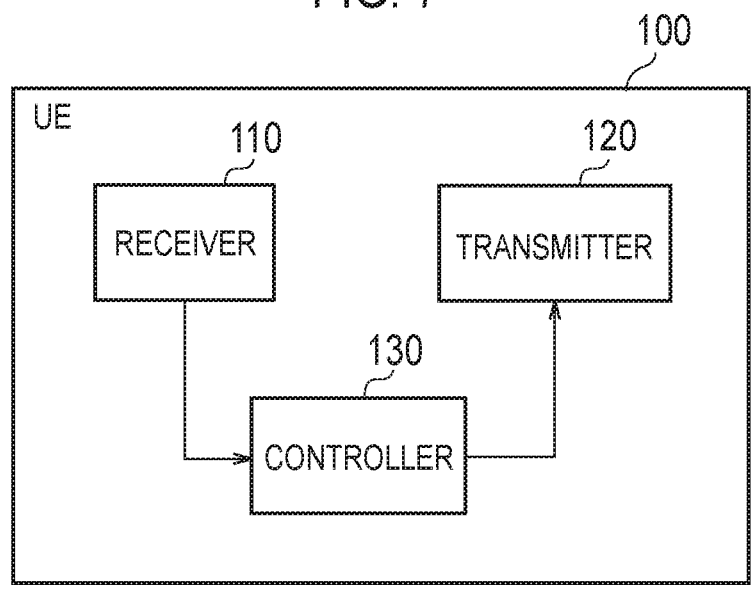
FIG. 7 is a block diagram of a UE 100.

The UE 100 (radio terminal) according to each embodiment will be described. FIG. 7 is a block diagram of the UE 100. As shown in FIG. 7, the UE 100 includes a receiver 110, a transmitter 120, and a controller 130. The receiver 110 and the transmitter 120 may be integrated transceivers.

The receiver 110 performs various types of reception under the control of the controller 130. Receiver 110 includes antennas. The receiver 110 converts a radio signal received by the antennas into a baseband signal (received signal). The receiver 110 outputs a baseband signal to the controller 130.

The transmitter 120 performs various transmissions under the control of the controller 130. The transmitter 120 includes antennas. The transmitter 120 converts a baseband signal (transmission signal) output from the controller 130 into a radio signal. The transmitter 120 transmits a radio signal from the antennas.

The controller 130 performs various controls in the UE 100. The controller 130 includes a processor and a memory. The memory stores programs executed by the processor and information used for processing by the processor. The processor includes a baseband processor and a CPU (Central Processing Unit). The baseband processor performs, for example, modulation/demodulation and encoding/decoding of a baseband signal. The CPU executes various processes by executing a program stored in the memory. The processor may include a codec for encoding/decoding audio/video signals. The processor executes various processes to be described later and the above-described various communication protocols.

The UE 100 may include a Global Navigation Satellite System (GNSS) receiver. The GNSS receiver can receive a GNSS signal to obtain location information indicating a geographical location of the UE 100. The GNSS receiver outputs the GNSS signal to the controller 130. The UE 100 may have a GPS (Global Positioning System) function for acquiring the position information of the UE 100. The UE 100 may have a function of position predicting such as an electronic compass, an acceleration sensor, and the like.

The UE 100 is a communication apparatus having a function capable of executing transmission and/or reception of direct signaling with another communication apparatus. Therefore, it goes without saying that the UE 100 may have other configurations (for example, functions, members, etc.).

In the present specification, processes performed by at least one of the receiver 110, the transmitter 120, and the controller 130 of the UE 100 will be described as processes (operations) executed by the UE 100 for the sake of convenience.

(Base Station)

Figure 8:
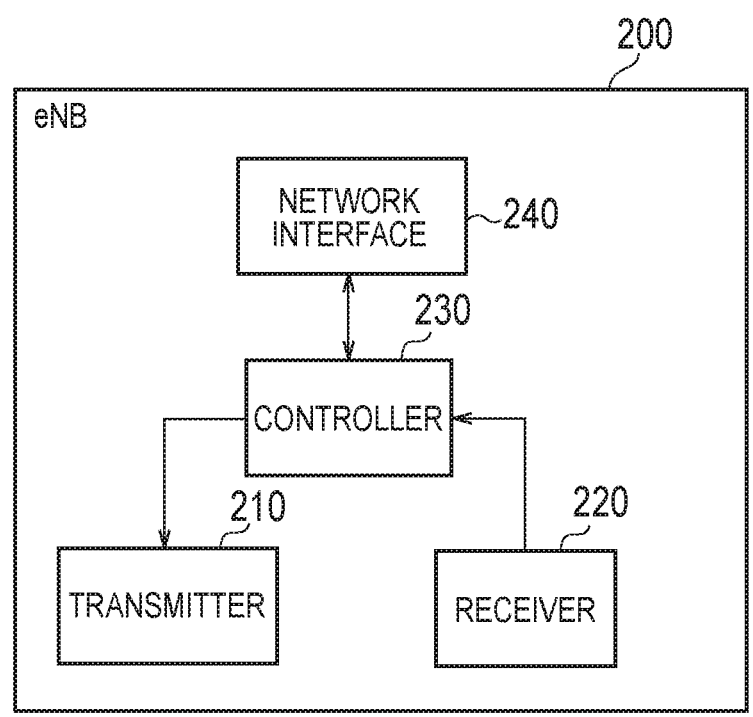
FIG. 8 is a block diagram of an eNB 200.

The eNB 200 (base station) according to each embodiment will be described. FIG. 8 is a block diagram of the eNB 200. As shown in FIG. 8, the eNB 200 includes a receiver 210, a transmitter 220, a controller 230, and a network interface 240. The receiver 210 and the transmitter 220 may be an integrated transceiver.

The receiver 210 performs various types of reception under the control of the controller 230. Receiver 210 includes antennas. The receiver 210 converts a radio signal received by the antennas into a baseband signal (received signal). The receiver 210 outputs a baseband signal to the controller 230.

The transmitter 220 performs various transmissions under the control of the controller 230. The transmitter 220 includes antennas. The transmitter 220 converts the baseband signal (transmission signal) output from the controller 230 into a radio signal. The transmitter 220 transmits a radio signal from the antennas.

The controller 230 performs various controls in the eNB 200. The controller 230 includes a processor and a memory. The memory stores programs executed by the processor and information used for processing by the processor. The processor includes a baseband processor and a CPU. The baseband processor performs modulation/demodulation, encoding/decoding, etc. of the baseband signal, for example. The CPU executes various processes by executing a program stored in the memory. The processor executes various processes to be described later and the above-described various communication protocols.

The network interface 240 is connected to the neighboring eNB 200 via the X2 interface. The network interface 240 is connected to the MME 300 and the SGW 400 via the S1 interface. For example, the network interface 240 is used for communication performed on the X2 interface and communication performed on the S1 interface.

In the present specification, processing performed by at least one of the receiver 210, the transmitter 220, the controller 230, and the network interface 240 of the eNB 200 will be described as a process (operation) executed by the eNB 200 for convenience.

(Network Apparatus)

A network apparatus (NW apparatus) according to each embodiment will be described next. The NW apparatus is at least any one of the MCE 11, the MBMS GW 21, the BM SC 22, the PGW 23, the Server 25, the GCS AS 31, the Server 35, the MME 300, and the SGW 400.

Figure 9:
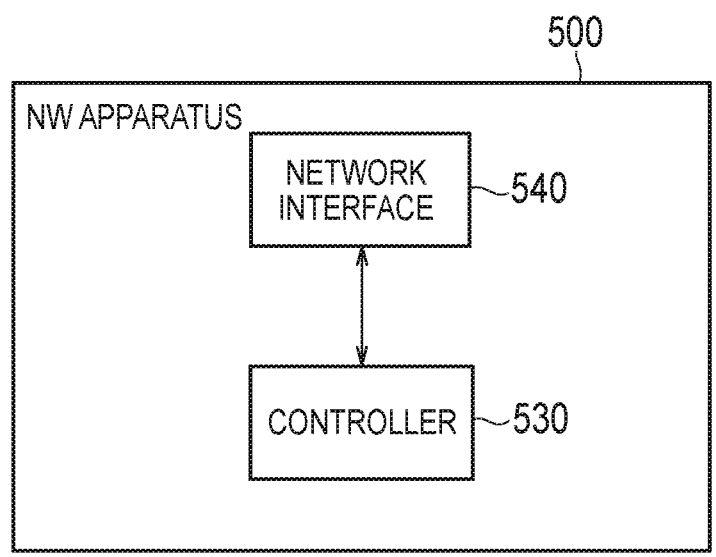
FIG. 9 is a block diagram of an NW apparatus 500.

FIG. 9 is a block diagram of the NW apparatus 500. As illustrated in FIG. 9, the NW apparatus 500 includes a controller 530 and a network interface 540.

The controller 530 is configured to perform various types of controls in the NW apparatus 500. The controller 630 includes a processor and a memory. The memory is configured to store a program to be executed by the processor, and information to be utilized for a processing by the processor. The processor includes a baseband processor and a CPU. The baseband processor is configured to perform, for example, modulation and demodulation, coding and decoding, and the like, of a baseband signal. The CPU is configured to perform various types of processes by running a program stored in the memory. The processor performs various types of processes described later, and various types of communication protocols described above.

The network interface 540 is connected to a node (the eNB 200 and/or another network apparatus) via a predetermined interface (for example, the S1 interface, the M1 interface, the M2 interface, or the M3 interface). The network interface 540 is used for communication with other network apparatuses that is to be performed on a predetermined interface.

For convenience, a process executed by at least one of the controller 530 and the network interface 540 included in the NW apparatus 500 is described herein as a process (operation) executed by the NW apparatus 500.

Operation According to First Embodiment

An operation according to the first embodiment will be described based on the following operation patterns 1 to 6.

(A) Operation Pattern 1

Figure 10:
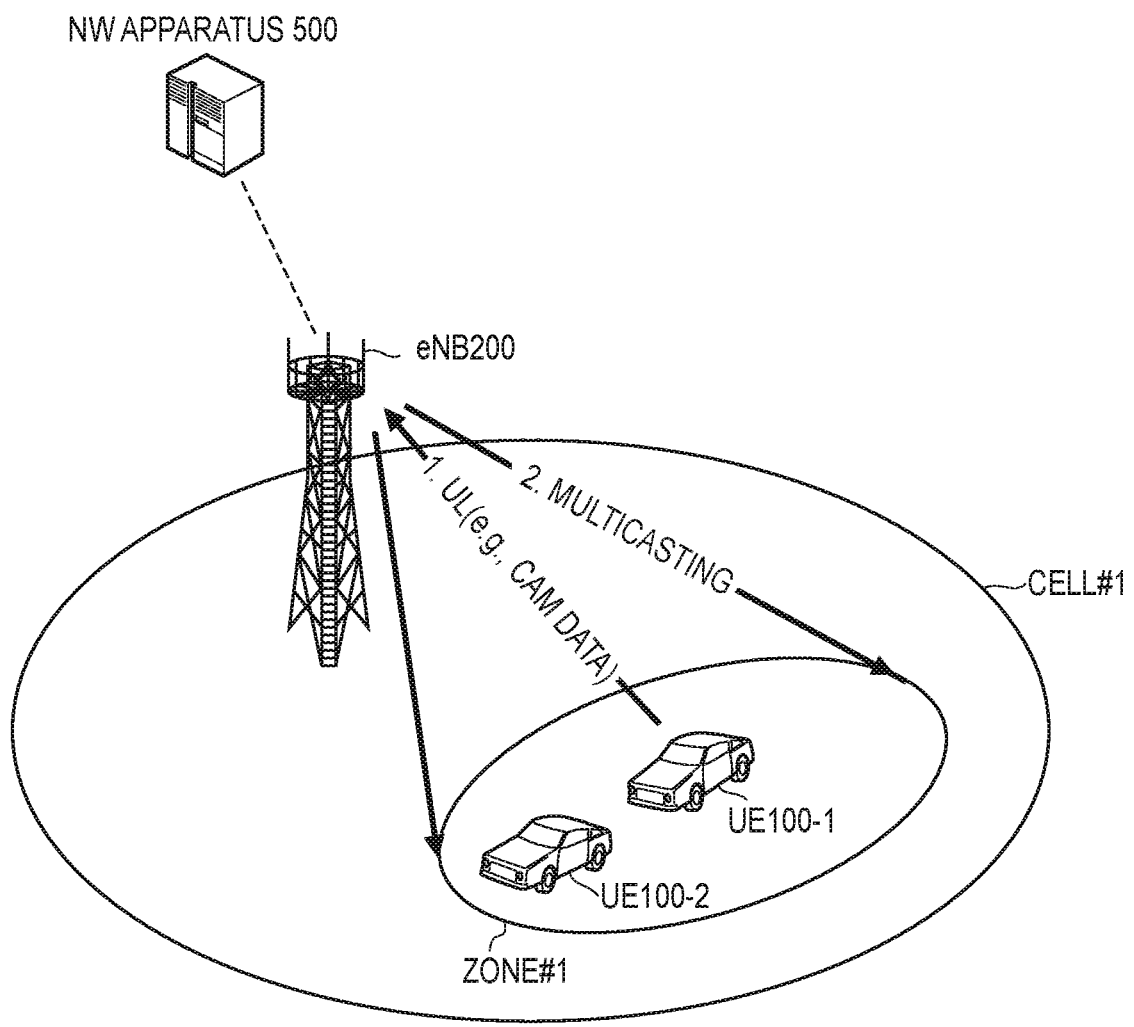
FIG. 10 is a diagram for describing an operation pattern 1.
Figure 11:
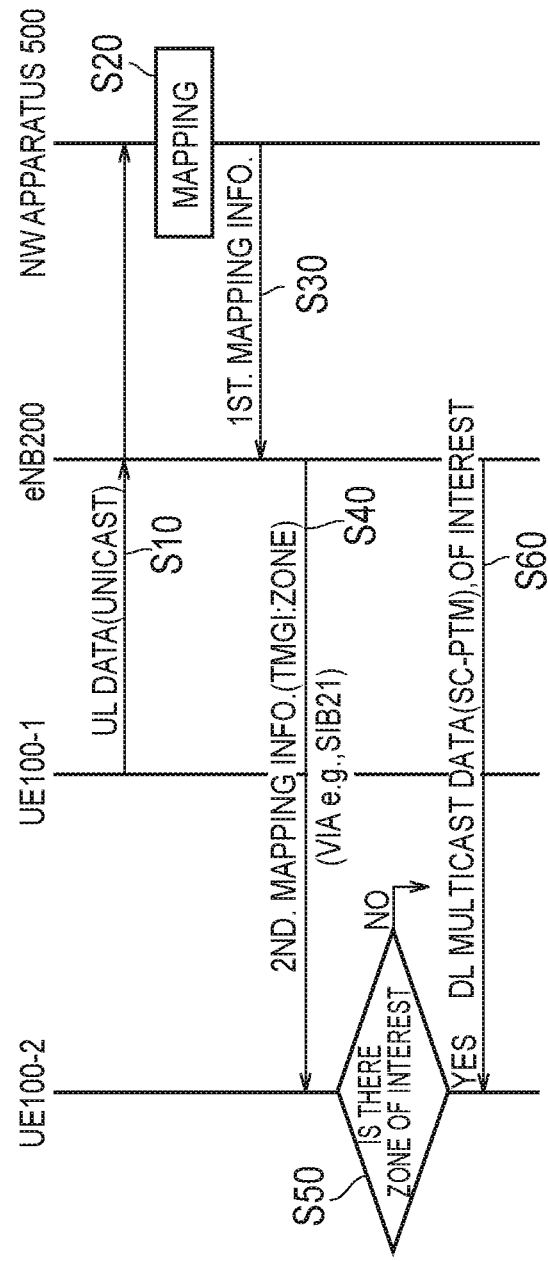
FIG. 11 is a sequence chart for describing an operation pattern 1 according to a first embodiment.

Operation pattern 1 will be described with reference to FIG. 10 and FIG. 11. FIG. 10 is a diagram for describing operation pattern 1. FIG. 11 is a sequence chart for describing operation pattern 1.

As illustrated in FIG. 10, the UE 100-1 and the UE 100-2 are located (exist) in a cell (cell #1) managed by the eNB 200. The UE 100-1 and the UE 100-2 are located in zone #1 that is a geographical area. The UE 100-1 and the UE 100-2 may have established an RRC connection with the eNB 200 (cell #1) (RRC connected state), or may not have established an RRC connection (RRC idle state). The UE 100-1 may establish an RRC connection with the eNB 200 in a case that a signal is transmitted to the eNB 200.

The network apparatus (NW apparatus) 500 is an entity configured to perform mapping. In the present embodiment, the NW apparatus 500 performs mapping between identification information for identifying multicast data and zone identification information for identifying a geographical area (that is, a zone). That is, the NW apparatus 500 associates the identification information with the zone identification information.

The identification information is, for example, a TMGI (Temporary Mobile Group Identity). The TMGI is an identifier associated with multicast data (that is, the MBMS (MBMS data, MBMS packet, contents, etc.)). The identification information may be a group identifier associated with the TMGI (for example, a G-RNTI (Group-Radio Network Temporary Identifier)). The G-RNTI is an RNTI for identification of a multicast group (for example, an SC-MTCH addressed to a specific group). The G-RNTI is mapped one-to-one with the TMGI. TMGI will be described as an example below.

The zone identification information may be an identifier (Zone ID) indicating a predetermined zone (for example, Zone #1). The zone identification information may be information (an expression, a parameter, and the like) for specifying (calculating) a predetermined zone. The Zone ID will be described as an example below. Therefore, the NW apparatus 500 decides a corresponding relationship (a first corresponding relationship) between the TMGI and the Zone ID.

In the present embodiment, the NW apparatus 500 is configured to perform mapping between the UL data and the TMGI. That is, the NW apparatus 500 can decide a corresponding relationship (a second corresponding relationship) between the UL data and the TMGI. The NW apparatus 500 may perform mapping between the UL data and a zone (Zone ID). Accordingly, the NW apparatus 500 may associate the UL data with the TMGI and/or the Zone ID.

In the present embodiment, the NW apparatus 500 is an upper node of the eNB 200. For example, the NW apparatus 500 is at least any one of the MCE 11, the MBMS GW 21, the BM-SC 22, the PGW 23, the Server 25, the GCS-AS 31, the Server 35, the MME 300, and the SGW 400.

As illustrated in FIG. 11, in step S10, the UE 100-1 transmits the UL data (by unicast) to the eNB 200 (PCell: Primary Cell/serving cell). The UE 100-1 may transmit the UL data together with the location information indicating the current location of the UE 100. The UE 100-1 may transmit the location information at a timing different from the UL data. The UE 100-1 may report the location information to the eNB 200 (network) by a method of reporting the geographical location on the AS (Access Stratum) layer. The AS layer is composed of a physical layer, a MAC layer, an RLC layer, a PDCP layer and an RRC layer.

The UL data is data sent from the network to the UE 100 as multicast data (MBMS data). The UL data is, for example, information to be transmitted to a UE adjacent to the UE 100-1. The UL data may be, for example, information to be received by the UE 100 located at least in Zone #1. For example, the UL data is a cooperative awareness message (CAM). For example, the UL data may be information indicating at least any one of the current location of the UE 100-1, the moving speed of the UE 100-1, and the movement direction of the UE 100-1. The UL data may include the identifier of the transmission-source UE (for example, the UE ID, the C-RNTI (Cell-Radio Network Temporary Identifier), etc.).

The UL data may include the location information. For example, the UE 100-1 may store the location information of the UE 100-1 into data in the application layer. The UE 100-1 may transmit the data as UL data to the eNB 200.

The location information indicates, for example, the location of the UE 100-1 based on a GNSS signal. The location information may be location information specified by another location specification means (for example, GPS). The location information may be zone identification information.

The eNB 200 is configured to transfer the UL data to the NW apparatus 500. The eNB 200 may transfer the location information to the NW apparatus 500. The NW apparatus 500 is configured to receive the UL data. The NW apparatus 500 is configured to receive the location information.

In step S20, the NW apparatus 500 performs mapping of the UL data.

The NW apparatus 500, based on the location information of the UE 100-1, specifies the zone (area) including the location of the UE 100-1 that is the transmission source of the UL data. The NW apparatus 500 maps (associates) the specified zone (Zone ID) with the TMGI. The NW apparatus 500 may map (associate) the UL data with the TMGI. The NW apparatus 500 may map (associate) the UL data with the specified zone. As a result, the NW apparatus 500 generates first mapping information (for example, a list). The first mapping information indicates a corresponding relationship between the UL data, the TMGI, and the zones. The first mapping information may indicate the corresponding relationship between the UL data and the zone. In this case, the NW apparatus 500 may generate second mapping information (for example, a list). The second mapping information indicates a corresponding relationship between the TMGI and a zone (Zone ID).

In operation pattern 1, the NW apparatus 500 associates one TMGI with one zone (Zone ID).

In step S30, the NW apparatus 500 sends the first mapping information (and the second mapping information) to the eNB 200.

The eNB 200 may, in a case that the second mapping information is not received, generate the second mapping information.

In step S40, the eNB 200 transmits the second mapping information to the UE 100-2. The eNB 200 can transmit the second mapping information to the UE 100-2 by dedicated signaling and/or broadcast signaling (for example, SIB: System Information Block (SIB 21, etc.)).

The eNB 200 may include the second mapping information in the SCPTM setting message. The SCPTM setting message is a message sent from the eNB 200 (the E-UTRAN 10) to the UE 100 via the SC-MCCH.

In step S50, the UE 100-2 determines whether or not to acquire (receive) the multicast data based on the second mapping information. That is, the UE 100-1 determines whether or not there is a zone of interest. Accordingly, the UE 100, based on the second mapping information, determines whether or not the UE 100 receives or is interested in receiving the multicast data (MBMS).

First, the UE 100-2 specifies zone identification information for identifying the zone in which the UE 100-2 is located. Specifically, the UE 100-2, based on the location information of the UE 100-2, specifies the zone (Zone ID #1) including the current location of the UE 100-2.

For example, if the second mapping information includes the specified Zone ID, the UE 100-2 may determine to acquire the multicast data. Accordingly, the UE 100-2 may, if the UE 100-2 is located within a range of the zone of interest, determine to acquire the multicast data. The UE 100-2 may, if the second mapping information includes the TMGI corresponding to the Zone ID specified, determine to acquire the multicast data. The UE 100-2 may, if the zone ID indicating the zone in which the UE 100-2 is located is not included, determine not to acquire multicast data.

The UE 100-2 may, if the UE 100-2 desires to acquire the UL data from a UE 100 in a zone different from Zone #1 including the current location of the UE 100-2, determine to acquire the multicast data. Accordingly, even if the second mapping information does not include the Zone ID indicating the zone in which the UE 100-2 is located, the UE 100-2 may determine to acquire the multicast data.

For example, the UE 100-2 may, if the UE 100-2 is close to an adjacent zone, decide the adjacent zone to be the zone of interest. UE 100-2 may decide the zone of interest according to at least any one of the following methods. The following methods may also be combined.

In a first method, the UE 100-2 decides a zone of interest in accordance with the location of the UE 100-2. For example, the UE 100-2 may decide the nearest adjacent zone from the location (current location) of the UE 100-2 as the zone of interest.

In a second method, the UE 100-2 decides a zone of interest in accordance with the moving speed of the UE 100-2. The UE 100-2 may, if the moving speed of the UE 100-2 exceeds the threshold value, decide the adjacent zone as the zone of interest.

In a third method, the UE 100-2 decides a zone of interest in accordance with the movement direction of the UE 100-2. The UE 100-2 may decide the adjacent zone located in the movement direction of the UE 100-2 as the zone of interest.

In a fourth method, the UE 100-2, in response to the distance from the location of the UE 100-2 to the boundary of the zone being less than a threshold value, decides an adjacent zone as the zone of interest. The threshold value may be weighted in accordance with the moving speed of the UE 100-2. For example, the threshold value (x [m]) may be "α [m]–offset value (y [s]×"moving speed of the UE 100-2 [m/s]")".

In a fifth method, the UE 100-2 decides a zone of interest in accordance with the time taken for the UE 100-2 to reach the boundary of the zone (estimated time). For example, the UE 100-2 decides an adjacent zone as the zone of interest in response to the estimated time being less than the threshold value.

In a sixth method, the UE 100-2 decides a zone of interest in response to an adjacent zone being a specific area (a specific zone). For example, the UE 100-2, in response to the reception of area information indicating that the adjacent zone is a specific area (for example, the Zone ID, latitude/longitude information, etc.) from the eNB 200, decides an adjacent zone as the zone of interest. The specific area is, for example, an area with a heavy traffic volume, an area where accidents occur, or the like.

The UE 100-2 may, for example, in response to the fulfillment of at least either one of the second method and the fifth method, decide an adjacent zone as the zone of interest.

The UE 100-2 may decide a zone other than an adjacent zone as the zone of interest. For example, the UE 100-2 may decide a zone located in the movement direction of the UE 100-2 as the zone of interest.

The threshold value and/or the area information may be preset (pre-configured) in the UE 100. The UE 100 may receive the threshold value and/or the area information from the eNB 200. The eNB 200 may transmit the threshold value and/or the area information to the UE 100-2 by dedicated signaling (for example, an RRC reconfiguration message, DCI (Downlink Control Information), and the like) and/or broadcast signaling (for example, SIB: System Information Block (SIB 21 or the like)).

The UE 100-2 may determine to acquire the multicast data associated with the decided zone (that is, the TMGI).

The UE 100-2, upon determining to acquire the multicast data, performs the process in step S60. Otherwise, the UE 100-2 terminates the process.

In step S60, the eNB 200 transmits the multicast data (DL multicast data). Specifically, the eNB 200 transmits the multicast data based on the second mapping information. The eNB 200 may transmit the multicast data via the SC-MTCH by SC-PTM transmission. The eNB 200 may transmit predetermined multicast data associated with the TMGI. The predetermined multicast data includes the UL data from the UE 100-1 in Zone #1 in which the UE 100-2 is located. In the physical layer, the eNB 200, after transmitting the PDCCH by using the G-RNTI, transmits the multicast data via the PDSCH.

The UE 100-2 specifies the TMGI associated with the specified zone (Zone ID #1) based on the second mapping information. The UE 100-2 receives the multicast data associated with the specified TMGI. The UE 100-2 receives predetermined multicast data corresponding to the TMGI associated with a zone (Zone ID) that the UE 100-2 either receives or is interested in receiving. The multicast data includes the UL data from the UE 100-1, and is identified by the TMGI.

The UE 100-2 is configured to perform PDCCH monitoring according to the setting for each TMGI. If the PDCCH can be decoded by the G-RNTI associated with the TMGI, the UE 100-2 receives the multicast data transmitted via the PDSCH according to the PDCCH.

Thus, even if the UE 100-1 does not know the destination of the UE 100-2 in zone #1 in which the UE 100-1 is located, the UE 100-2 can receive the UL data from the UE 100-1.

The multicast data (DL data) may, for example, include each UL data from a plurality of UEs existing in the same zone. That is, the UL data may be aggregated (multiplexed) in the multicast data. The UL data included in the DL data may be associated with (or may include) the identifier of the transmission-source UE (UE 100-1). For example, if the UE 100-2 is receiving multicast data based on the same TMGI as the UE 100-1, the UE 100-2 can discard (ignore) the UL data of the UE 100-2 included in the received multicast data (DL data).

The UE 100-2 may receive the multicast data corresponding to the TMGI associated with a zone different from zone #1. As a result, the UE 100-2 can also receive the UL data of the UE in the zone in which the UE 100-2 is not located.

The UE 100-2 can perform control related to the movement based on the UL data included in the predetermined multicast data.

(B) Operation Pattern 2

Figure 12:
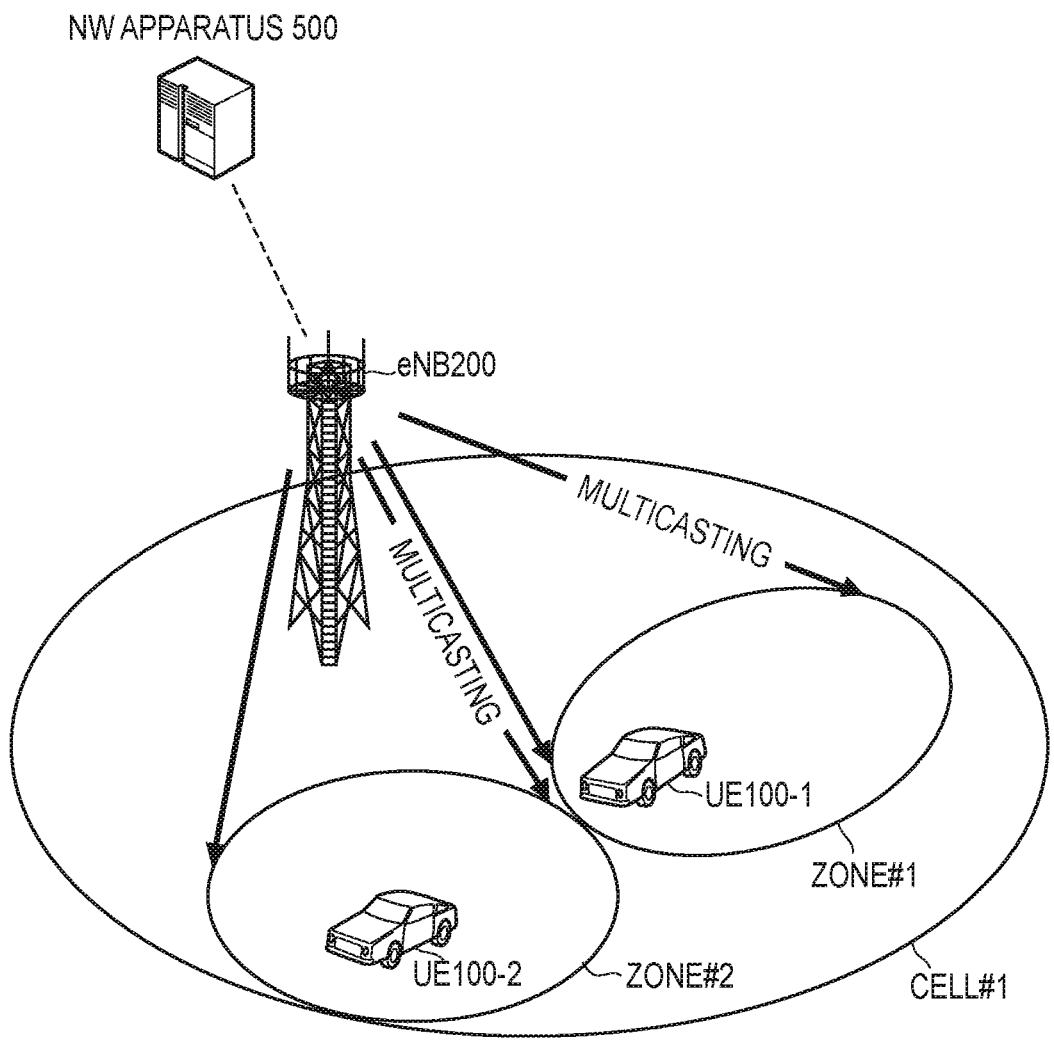
FIG. 12 is a diagram for describing an operation pattern 2 according to the first embodiment.
Figure 13:
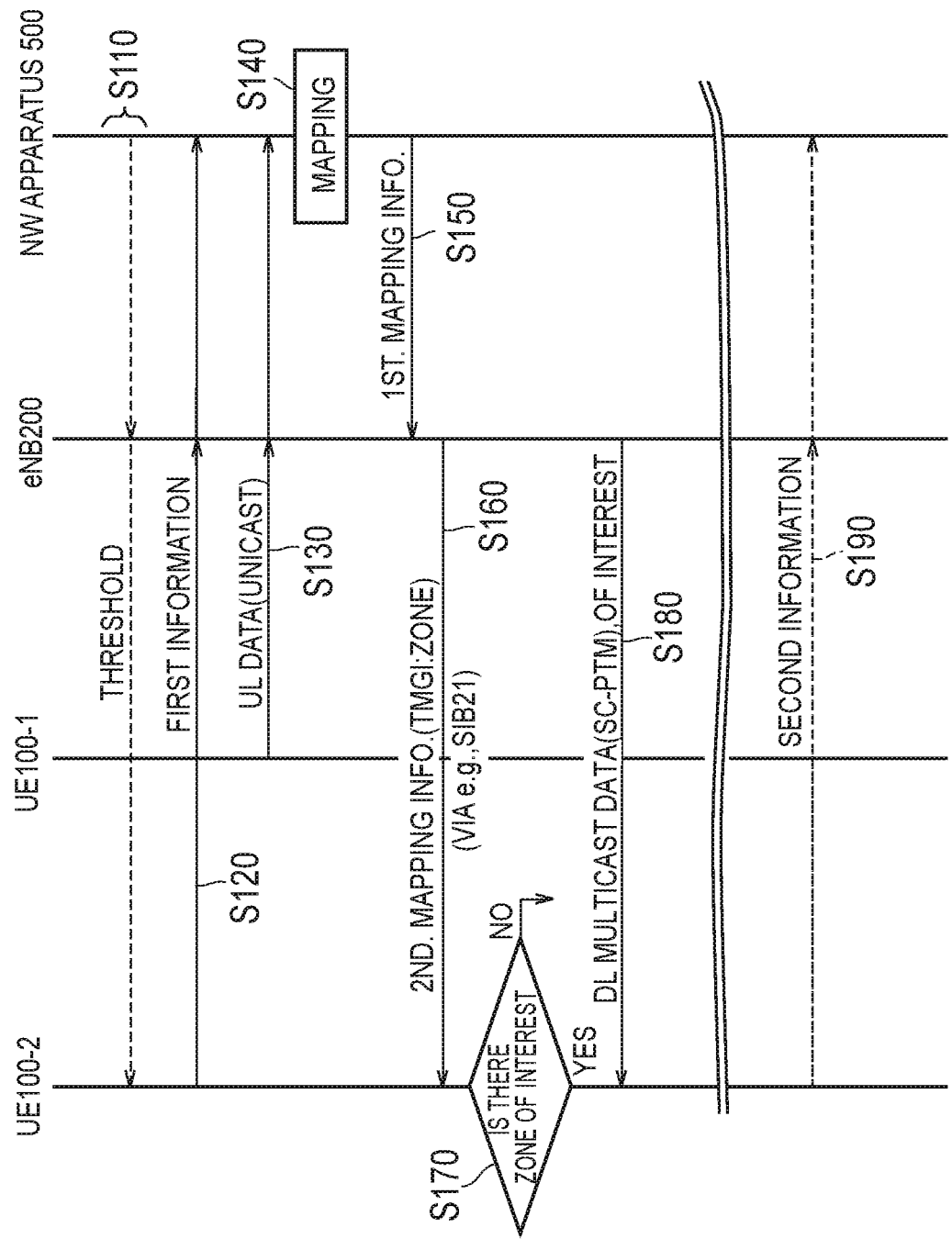
FIG. 13 is a sequence chart for describing an operation pattern 2 according to the first embodiment.
Figure 14:
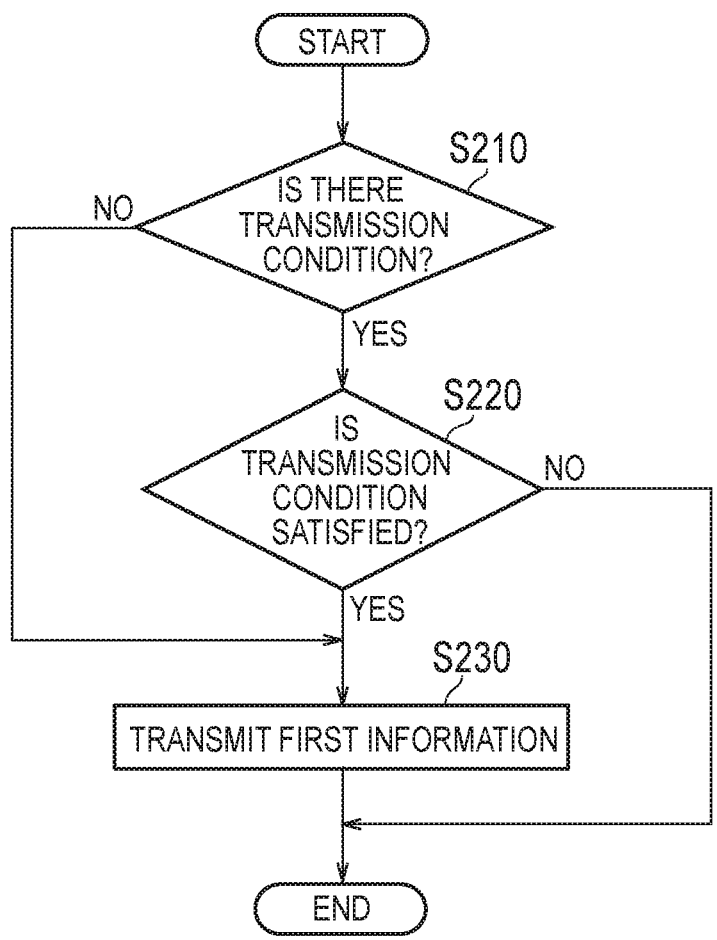
FIG. 14 is a flowchart for describing an operation pattern 2 according to the first embodiment.

Operation pattern 2 will be described with reference to FIG. 12 to FIG. 14. FIG. 12 is a diagram for describing operation pattern 2. FIG. 13 is a sequence chart for describing operation pattern 2. FIG. 14 is a flowchart for describing operation pattern 2. The description of content similar to the content described above will be omitted.

In operation pattern 2, in response to the signaling from the UE 100-2 performing the receiving operation of multicast data, the NW apparatus 500 determines whether or not to associate a plurality of zone identification information (Zone ID) with the TMGI (identification information).

As illustrated in FIG. 12, the UE 100-1 and the UE 100-2 are located (exist) in a cell (cell #1) managed by the eNB 200. The UE 100-1 is located in zone #1 (Zone #1). On the other hand, UE 100-2 is located in zone #2 (Zone #2) different from zone #1.

As illustrated in FIG. 13, in step S110, the eNB 200 may transmit a transmission condition (Threshold) of the first information to the UE 100-2. The eNB 200 can transmit the transmission condition to the UE 100-2 by dedicated signaling (for example, an RRC reconfiguration message, DCI (Downlink Control Information), and the like) and/or broadcast signaling (for example, SIB: System Information Block (SIB 21 or the like)). The NW apparatus 500 may transmit the transmission condition to the UE 100-2 via the eNB 200.

The UE 100-2 determines whether or not the UE 100-2 intends to receive data from the UE 100 in a zone different from zone #2 in which the UE 100-2 is located (for example, zone #1). The UE 100-2 can make a determination by using a method similar to the one in operation pattern 1 described above. It may be assumed that the UE 100-2 intends to receive data (UL data) from the UE 100 in the zone of interest.

In step S120, the UE 100-2 transmits first information to the eNB 200 (the NW apparatus 500).

The first information, for example, intends (requests) the transmission of predetermined multicast data including the UL data from the UE 100 in a zone different from zone #1 of the UE 100-2 (for example, Zone #2), by the eNB 200. The first information may be information indicating that the multicast (multi-zone multicast) of the UL data in another zone is necessary. The first information may be information indicating that the UE 100-2 intends to receive (is interested in receiving) the UL data in another zone.

The first information may include information indicating a zone of interest (Zone ID, parameters/equations for calculating the zone of interest, latitude/longitude information, etc.). The first information may be a list indicating a plurality of zones. The UE 100-2 may, for example, transmit a V2XUE information message including the first information to the eNB 200.

The UE 100-2 may, in response to the fulfillment of the transmission condition, transmit the first information to the eNB 200.

The transmission condition is, for example, a condition based on at least any one of the distance from the location of the UE 100-2 to the boundary of the zone being less than the threshold value, the time taken for the UE 100-2 to reach the boundary of the zone (estimated time), and a different zone being a specific area (a specific zone). The UE 100 can determine, by a method similar to that in operation pattern 1, whether or not the transmission condition is fulfilled. For example, the UE 100-2 may, in response to the distance from the location of the UE 100-2 to the boundary of the zone being less than the threshold value, determine that the transmission condition is fulfilled. The UE 100-2 may, in response to the estimated time being less than the threshold value, determine that the transmission condition is fulfilled. The UE 100 may, in response to the indication of the adjacent zone by the area information, determine that the transmission condition is fulfilled. The UE 100-2 may, in response to the fulfillment of at least one of the plurality of transmission conditions, determine that the transmission condition is fulfilled.

An operation of the UE 100-2 will be described with reference to FIG. 14. The UE 100-2 may start the process in step S210 in response to the occurrence of a zone of interest.

In step S210, the UE 100-2 determines whether or not a transmission condition exists. The UE 100-2, if a transmission condition exists, performs the process in step S220. On the other hand, the UE 100-2, if a transmission condition does not exist, performs the process in step S230.

In step S220, the UE 100-2 determines whether or not the transmission condition is fulfilled. The UE 100-2, if the transmission condition is fulfilled, performs the process in step S230. On the other hand, the UE 100-2, if the transmission condition is not fulfilled, terminates the process.

In step S230, the UE 100-2 transmits the first information.

The process returns to step S120. The eNB 200, upon receiving the first information, transfers the first information to the NW apparatus 500. The NW apparatus 500 receives the first information.

Step S130 corresponds to step S10.

Step S140 corresponds to step S20. The NW apparatus 500, based on the first information, determines whether or not to associate one TMGI with a plurality of zones. The NW apparatus 500, based on the first information, for example, associates TMGI #2 with Zone ID #1 and Zone ID #2. The NW apparatus 500 may associate the UL data from the UE 100-1 located in Zone #1 with TMGI #2 (Zone ID #2).

Steps S150 to S180 correspond to steps S30 to S60. In the second mapping information, one TMGI is associated with a plurality of zones. Accordingly, the UE 100-2 can receive the UL data from not only the UE 100 in the zone in which the UE 100-2 is located, but also from the UE 100-1 in the other zone.

In step S190, the UE 100-2 may transmit the second information to the eNB 200 (the NW apparatus 500).

The second information, for example, indicates that the eNB 200 need not (is no longer requested to) transmit the predetermined multicast data including the UL data from the UE 100 in a zone different from zone #2 of the UE 100-2 (for example, Zone #1). The second information may be information indicating that the multicast (multi-zone multicast) of the UL data in another zone is not required. The second information may be information indicating that the UE 100-2 does not intend to receive (is not interested in receiving) the UL data in another zone.

The UE 100-2 may, in response to the fulfillment of a second transmission condition different from the transmission condition described above, transmit the second information to the eNB 200. The UE 100-2 may, in response to the non-fulfillment of the transmission condition described above, transmit the second information to the eNB 200. For example, the UE 100-2 may, in response to the distance from the location of the UE 100-2 to the boundary of the zone being equal to or more than the threshold value, determine that the second transmission condition is fulfilled. The UE 100-2 may, in response to the estimated time being equal to or more than the threshold value, determine that the second transmission condition is fulfilled. The UE 100 may, in response to the non-indication of the adjacent zone by the area information, determine that the second transmission condition is fulfilled. The UE 100-2 may, in response to the fulfillment of at least one of the plurality of second transmission conditions, determine that the second transmission condition is fulfilled.

The UE 100 may, similarly to steps S210 to S230 described above, determine whether or not to transmit the second information.

The eNB 200, upon receiving the second information, transfers the second information to the NW apparatus 500. The NW apparatus 500 receives the second information.

The NW apparatus 500, based on the second information, determines whether or not to associate one TMGI with a plurality of zones. The NW apparatus 500, based on the first information, for example, associates TMGI #2 with only Zone ID #2. That is, the NW apparatus 500 may terminate the association of TMGI #2 with Zone ID #1. In this manner, the NW apparatus 500 may, based on the second information, terminate the association of one TMGI with a plurality of zones. As a result, the UE 100-2 can suppress the reception of UL data from the UE 100 located in another zone.

(C) Operation Pattern 3

Figure 15:
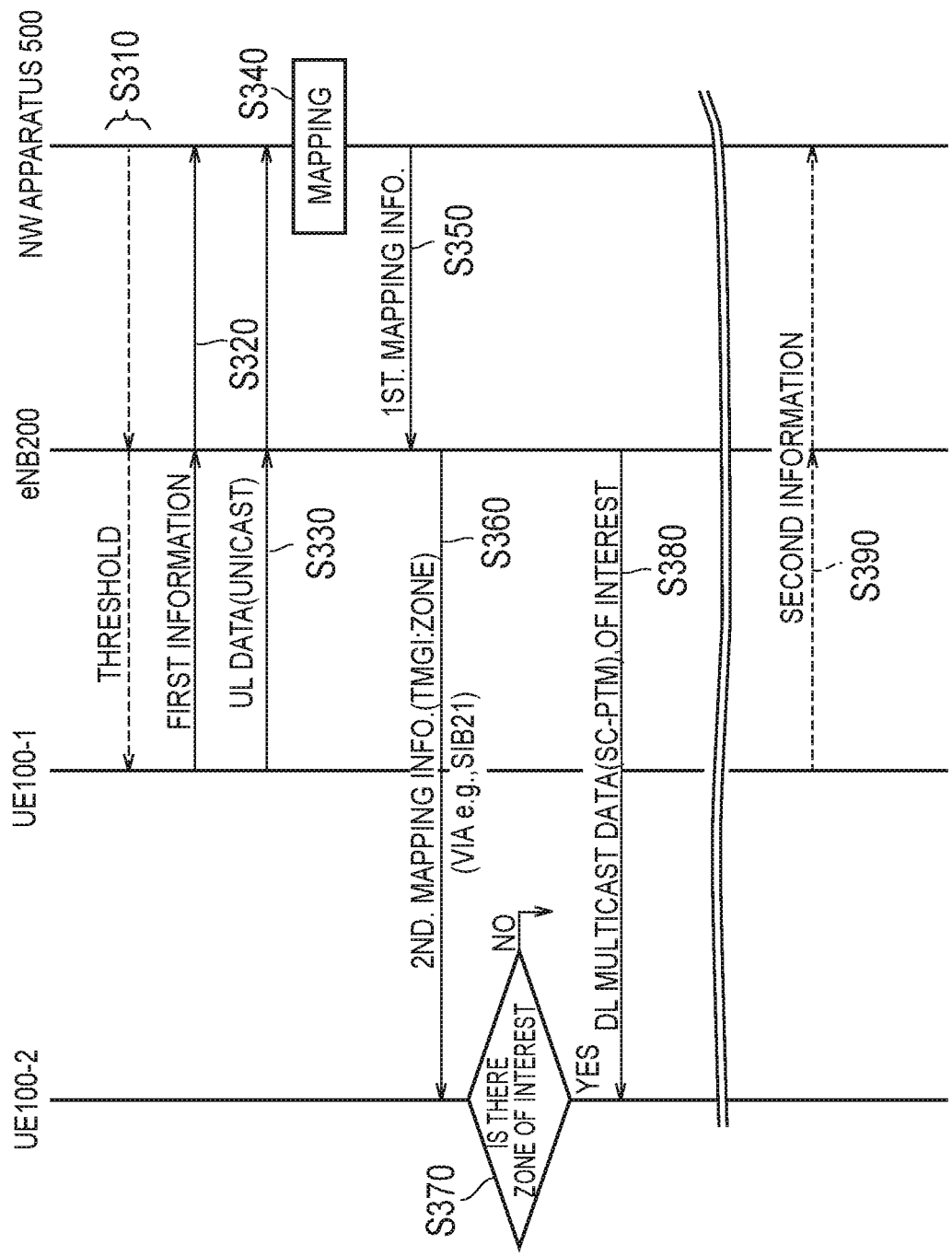
FIG. 15 is a sequence chart for describing an operation pattern 3 according to the first embodiment.

Operation pattern 3 will be described with reference to FIG. 15. FIG. 15 is a sequence chart for describing operation pattern 3. The description of content similar to the content described above (in particular, operation pattern 2) will be omitted.

In operation pattern 3, in response to the signaling from the UE 100-1 performing the transmission operation of multicast data, the NW apparatus 500 determines whether or not to associate a plurality of zone identification information (Zone ID) with the TMGI (identification information). Operation pattern 3 has an environment similar to that in operation pattern 2 (FIG. 12).

As illustrated in FIG. 15, in step S310, the eNB 200 may transmit a transmission condition (Threshold) of the first information to the UE 100-1. The eNB 200 can transmit a transmission condition to the UE 100-1 by dedicated signaling (for example, an RRC reconfiguration message, DCI and the like) and/or broadcast signaling (for example, SIB (SIB 21 and the like)). The NW apparatus 500 may transmit the transmission condition to the UE 100-1 via the eNB 200. The transmission condition is similar to that in operation pattern 2.

The UE 100-1 determines whether or not the UE 100-1 intends to transmit data (UL data) from the UE 100-1 in a zone different from zone #1 in which the UE 100-1 is located (for example, zone #2). The UE 100-1 can make a determination by using a method similar to the one in operation pattern 1 described above. It may be assumed that the UE 100-2 intends to transmit the data from the UE 100-2 in the zone of interest.

In step S320, the UE 100-1 transmits first information to the eNB 200 (the NW apparatus 500).

The first information, for example, intends (requests) the transmission of multicast data including the UL data from the UE 100-1 in a zone different from zone #1 of the UE 100-1 (for example, Zone #2), by the eNB 200. The first information may be information indicating that the multicast (multi-zone multicast) of the UL data from the UE 100-1 in another zone is needed. The first information may be information indicating that the UE 100-1 intends to transmit (is interested in transmitting) the UL data from the UE 100-1 in another zone.

The first information may include information indicating a zone of interest (Zone ID, parameters/equations for calculating the zone of interest, latitude/longitude information, etc.). The first information may be a list indicating a plurality of zones. The UE 100-1 may, for example, transmit a V2XUE information message including the first information to the eNB 200. The UE 100-1 may, in response to the fulfillment of the transmission condition, transmit the first information to the eNB 200. The UE 100-1 may perform an operation similar to the flowchart in FIG. 14.

Steps S330 to S380 correspond to steps S130 to S180. In step S380, even if the UE 100-2 does not transmit the first information, the UE 100-2 can receive the UL data from not only the UE 100 in the zone in which the UE 100-2 is located, but also from the UE 100-1 in the other zone.

In step S390, the UE 100-1 may transmit the second information to the eNB 200 (the NW apparatus 500).

The second information, for example, indicates that the eNB 200 need not (is no longer requested to) transmit the predetermined multicast data including the UL data from the UE 100-1 in a zone different from zone #1 of the UE 100-1 (for example, Zone #2). The second information may be information indicating that the multicast (multi-zone multicast) of the UL data from the UE 100-1 in another zone is not needed. The second information may be information indicating that the UE 100-1 does not intend to transmit (is not interested in transmitting) the UL data in another zone.

The UE 100-1 may, in response to the fulfillment of a second transmission condition different from the transmission condition described above, transmit the second information to the eNB 200. The second transmission condition is similar to the second transmission condition described above.

The eNB 200, upon receiving the second information, transfers the second information to the NW apparatus 500. The NW apparatus 500 receives the second information. The NW apparatus 500, as described above, based on the second information, determines whether or not to associate one TMGI with a plurality of zones. As a result, it is possible to prevent the reception of UL data from the UE 100-1 by the UE 100 located in another zone.

(D) Operation Pattern 4

Figure 16:
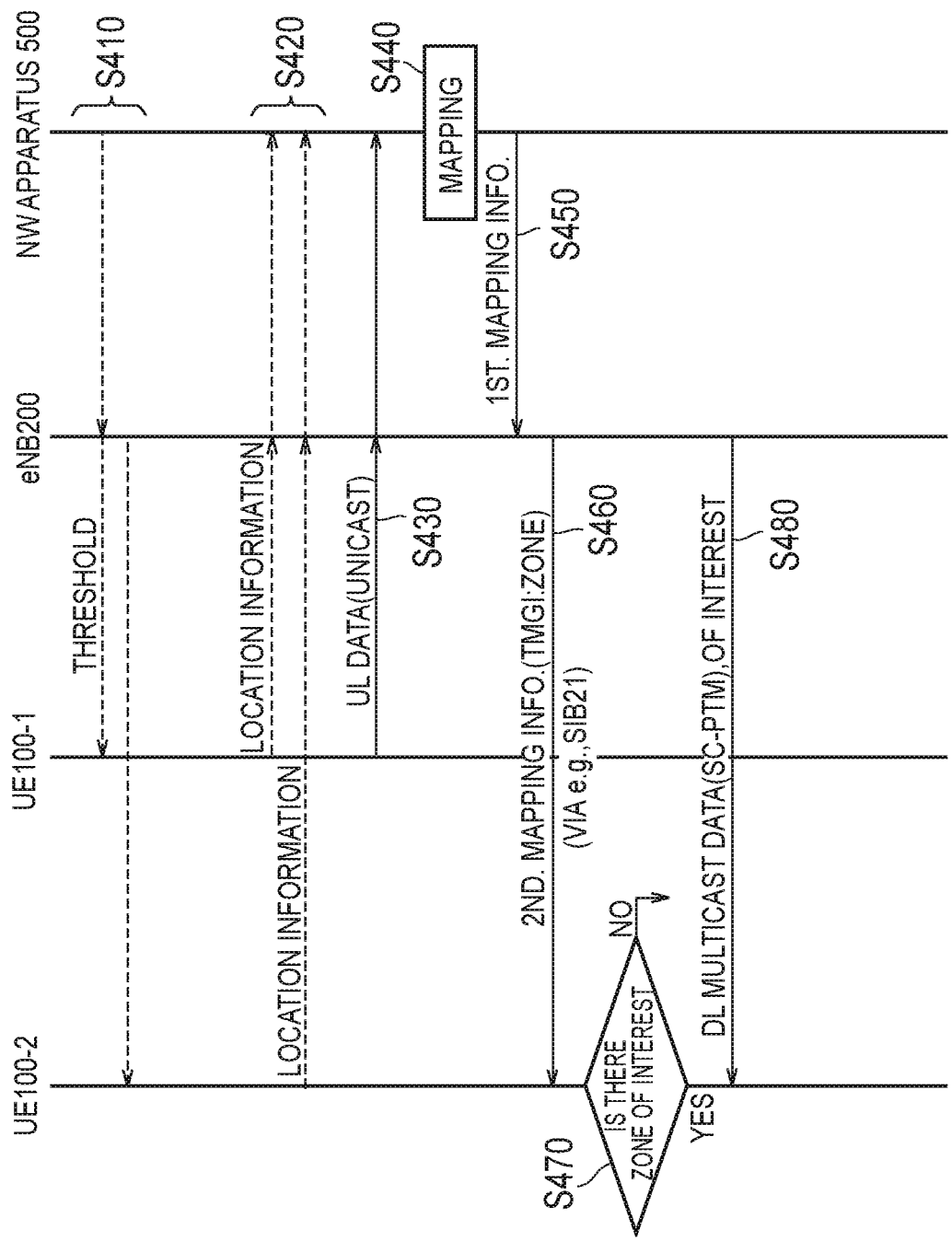
FIG. 16 is a sequence chart for describing an operation pattern 4 according to the first embodiment.

Operation pattern 4 will be described with reference to FIG. 16. FIG. 16 is a sequence chart for describing operation pattern 4. The description of content similar to the content described above will be omitted.

In operation pattern 4, at the initiative of the NW apparatus 500, it is determined whether or not to associate a plurality of zone identification information (Zone ID) with the TMGI (identification information). Operation pattern 4 has an environment similar to that in operation pattern 2 (FIG. 12).

As illustrated in FIG. 16, in step S410, the eNB 200 may transmit a transmission condition (Threshold) of the location information to the UE 100-2. The eNB 200 can transmit a transmission condition to the UE 100-2 by dedicated signaling (for example, an RRC reconfiguration message, DCI and the like) and/or broadcast signaling (for example, SIB (SIB 21 and the like)). The NW apparatus 500 may transmit the transmission condition to the UE 100-2 via the eNB 200.

The transmission condition of the location information is similar to the transmission condition of the first information. The transmission condition of the location information may be the same as the transmission condition of the first information, or may be different.

In step S420, UE 100-1 and/or the UE 100-2 can transmit the location information of the UE 100-1 and/or the UE 100-2 to eNB 200 (the NW apparatus 500). The UE 100-1 and/or the UE 100-2 may transmit the location information if the transmission condition is fulfilled.

Step S430 corresponds to step S10.

Step S440 corresponds to step S20. The NW apparatus 500, based on the location information of the UE 100, determines whether or not to associate one TMGI with a plurality of zones. For example, the NW apparatus 500 may, in response to the closeness of the UE 100-1, which is the transmission source of the UL data, to an adjacent zone (Zone #2) (that is, the UE 100-1 is located at the zone edge), determine that one TMGI is to be associated with a plurality of zones. The NW apparatus 500 may, in response to the farness of the UE 100 in the adjacent zone (Zone #2) from an adjacent zone (Zone #1), determine that one TMGI is not to be associated with a plurality of zones.

The NW apparatus 500 may, in response to the closeness of the UE 100-2 in the adjacent zone (Zone #2) to an adjacent zone (Zone #1) (that is, the UE 100-2 is located at the zone edge), determine that one TMGI is to be associated with a plurality of zones. The NW apparatus 500 may, in response to the farness of the UE 100 in the adjacent zone (Zone #2) from an adjacent zone (Zone #1), determine that one TMGI is not to be associated with a plurality of zones.

The NW apparatus 500 may, in response to the existence of the UE 100 in the adjacent zone (Zone #2), determine that one TMGI is to be associated with a plurality of zones. The NW apparatus 500 may, in response to the non-existence of the UE 100 in the adjacent zone (Zone #2), determine that one TMGI is not to be associated with a plurality of zones.

The NW apparatus 500 may, based on a criterion similar to the transmission condition of the location information (that is, the distance from the location of the UE 100 to the boundary of the zone, the estimated time, etc.), determine whether or not the UE 100-1 and/or the UE 100-2 are close to the adjacent zone. That is, the NW apparatus 500 may, based on a criterion similar to the transmission condition of the location information, determine whether or not to associate one TMGI with a plurality of zones.

Steps S450 to S480 correspond to steps S30 to S60. The eNB 200 may, if the location information from the UE 100-1 and/or the UE 100-2 is updated, again determine whether or not to associate one TMGI with a plurality of zones.

Thus, even if there is no signaling (first information and/or second information) from the UE 100, the NW apparatus 500 can determine whether or not to associate one TMGI with a plurality of zones.

With the first information and/or the second information from the UE 100 as a trigger, the NW apparatus 500 may start to determine whether or not to associate one TMGI with a plurality of zones.

(E) Operation Pattern 5

Figure 17:
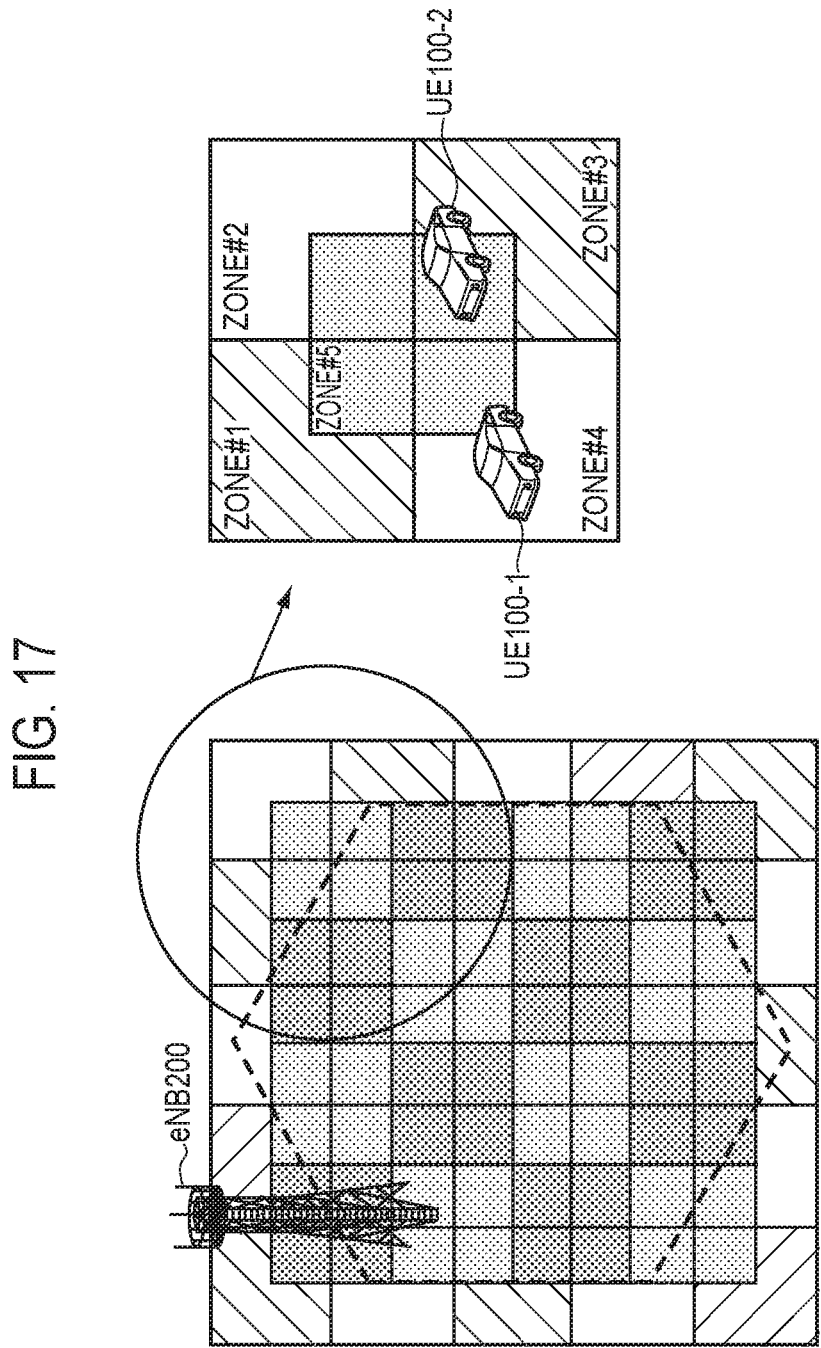
FIG. 17 is a diagram for describing an operation pattern 5 according to the first embodiment.

Operation pattern 5 will be described with reference to FIG. 17. FIG. 17 is a diagram for describing operation pattern 5. The description of content similar to the content described above will be omitted.

In operation pattern 5, the eNB 200 defines a zone (zone identification information) so that a plurality of zones are arranged in an overlapping manner.

As illustrated in FIG. 17, the eNB 200 may define a zone (zone identification information) so that a plurality of zones are arranged in an overlapping manner. For example, Zone

5 may be arranged so as to overlap Zone #1 to Zone #4. The UE 100-1 is located in Zone #4. The UE 100-2 is located in Zone #2 and Zone #5.

As a result, the UE 100-2 can, based on the second mapping information, specify the TMGI associated with Zone #2 (for example, TMGI #3) and the TMGI associated with Zone #5 (for example, TMGI #5). Therefore, the UE 100-2 can acquire each multicast data associated with the specified TMGI #3 and TMGI #5.

Therefore, as in operation pattern 1, even if the NW apparatus 500 associates one TMGI with one zone (Zone ID), the UE 100-2 can acquire each multicast data corresponding to each of the plurality of the TMGIs.

(F) Operation Pattern 6

Figure 18:
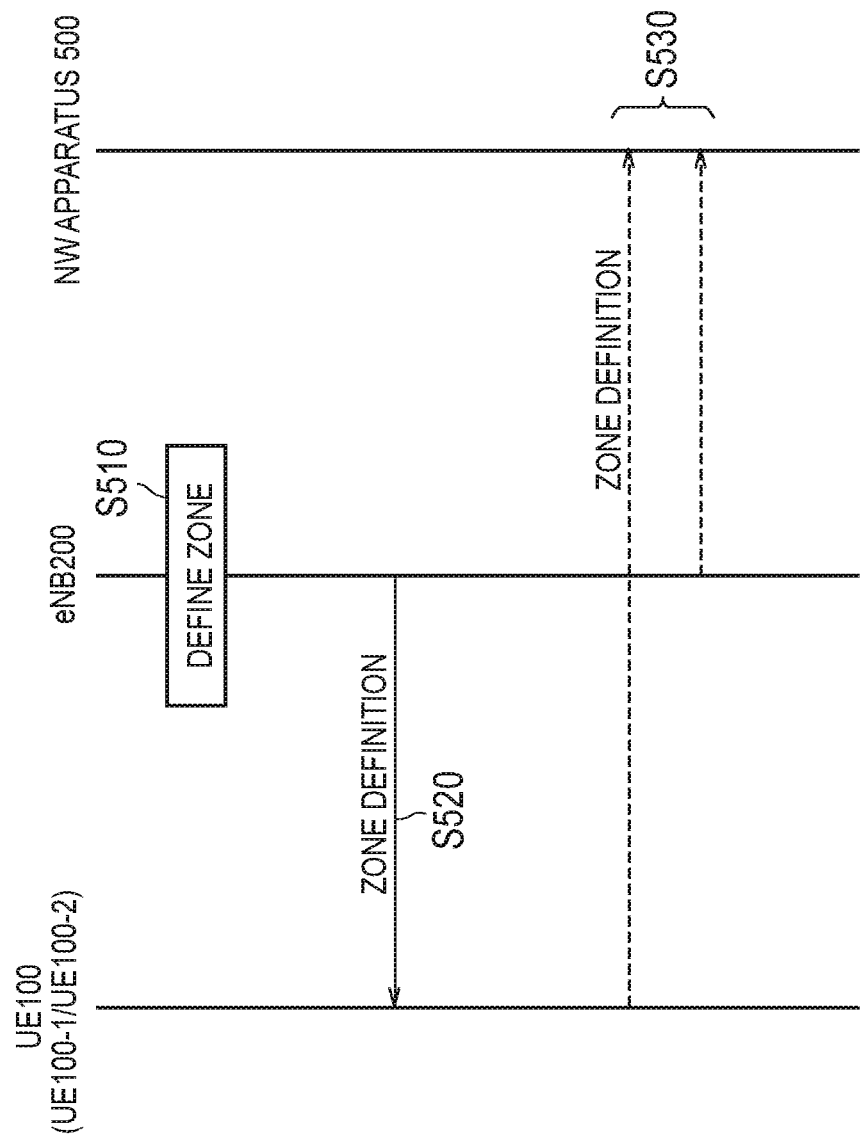
FIG. 18 is a sequence chart for describing an operation pattern 6 according to the first embodiment.

Operation pattern 6 will be described with reference to FIG. 18. FIG. 18 is a sequence chart for describing operation pattern 6. The description of content similar to the content described above will be omitted.

In operation pattern 6, in the initial state, the NW apparatus 500 does not know the zone (zone identification information) defined by the eNB 200.

In step S510, the eNB 200 defines a zone (zone identification information) to be applied in a cell of the eNB 200.

In step S520, the eNB 200 transmits the information (zone definition information) for defining a zone (zone identification information) to the UE 100 (UE 100-1/UE 100-2).

The zone definition information may be, for example, indicated by an orthogonal coordinate system (x, y). The zone definition information may include information indicating the length of the zone, the width of the zone, and a reference point. The zone definition information may indicate one zone. The zone definition information may include information indicating the maximum number of zones (x direction and/or y direction). The zone definition information may include information indicating a difference from the reference point.

The zone definition information may include the RF fingerprint information. For example, the zone definition information may be information indicating a classification according to a cell ID and a range of a reception level of a radio signal from the cell (for example, RSRP: Reference Signal Received Power/RSRQ: Reference Signal Received Quality). Instead of the range of the reception level, an arrival angle of the radio signal, a time difference of the radio signal, or the like may be used as the zone definition information.

The zone definition information may include information indicating the latitude and longitude of two vertices located diagonally (for example, the latitude and longitude of a point in the northeast and the latitude and longitude of a point in the southwest) among the four vertices of a rectangular zone. This information may be based on a geodetic system (for example, WGS 84: World Geodetic System 1984).

The zone definition information may be, for example, indicated by a polar coordinate system (r, θ). The zone definition information may include information indicating r, θ, and a reference point. r may be indicated, for example, by a timing advance value for adjusting the reception of UL data in the eNB 200. The reference point may be the location of the eNB 200.

The zone definition information may include location information of a dynamically changing dynamic reference point. For example, the dynamic reference point may be a reference point corresponding to the location of the transmitting UE 100 configured to transmit the UL data. The dynamic reference point may be different from a static reference point. The zone may be calculated based on the location of the dynamic reference point.

The eNB 200 may transmit the location information of the dynamic reference point by broadcast (for example, SIB). The eNB 200 may transmit the location information of the dynamic reference point via the SC-MCCH and/or the MCCH. The location information of the dynamic reference point may be associated with a TMGI. The eNB 200 may transmit the location information of the dynamic reference point via the PDSCH or the PDSCH. The location information of the dynamic reference point may be included in the data by SCPTM transmission. For example, a header that stores the location information of the dynamic reference point, and that is different from the data payload may be attached at the beginning of the PDSCH.

In step S530, the UE 100 may notify the zone definition information to the NW apparatus 500. The UE 100 may notify the zone definition information together with the UL data in operation pattern 1 to the NW apparatus 500. The UE 100 may notify the zone definition information together with the location information of the UE 100 to the NW apparatus 500.

The eNB 200 may notify the zone definition information to the NW apparatus 500. The NW apparatus 500 can, based on the zone definition information, grasp the zone defined by the eNB 200. The NW apparatus 500 can, based on the zone definition information, associate the TMGI with the zone ID. The NW apparatus 500 can, based on the zone definition information and the location information of the UE 100, grasp the zone in which the UE 100 is located. As a result, the NW apparatus 500 can associate the UL data with the TMGI and/or the Zone ID.

Thus, even if the eNB 200 generates (or updates) the zone definition information, the NW apparatus 500 can appropriately perform mapping (association).

The NW apparatus 500 may perform mapping based on the preset zone definition information rather than the zone defined by the eNB 200.

Second Embodiment

Operation According to Second Embodiment

An operation according to the second embodiment will be described based on the following operation patterns 1 to 5.

(A) Operation Pattern 1

Figure 19:
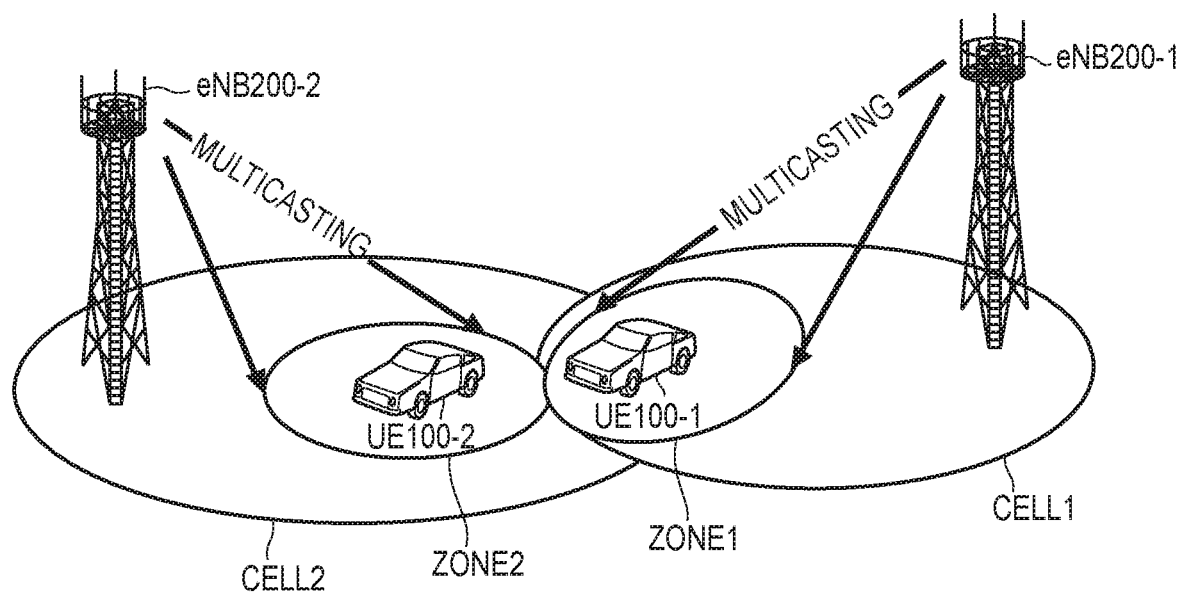
FIG. 19 is a diagram for describing an operation environment of operation pattern 1 according to a second embodiment.
Figure 22:
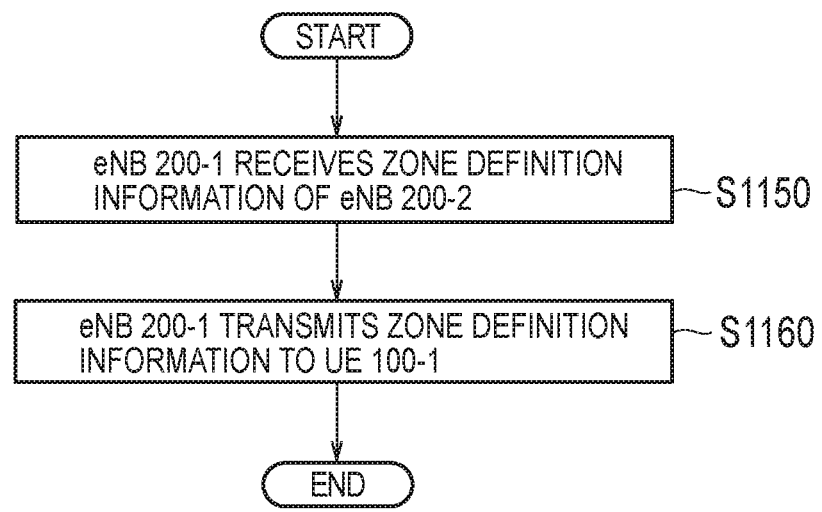
FIG. 22 is a flowchart for describing an operation of an eNB 200-1 according to the second embodiment.

Operation pattern 1 will be described with reference to FIG. 19 to FIG. 22. FIG. 19 is a diagram for describing an operation environment of operation pattern 1. FIG. 20 is a sequence chart for describing operation pattern 1. FIG. 21 is a diagram for describing an example of a message. FIG. 22 is a flowchart for describing an operation of the eNB 200-1.

As illustrated in FIG. 19, the UE 100-1 is located (exists) in Cell 1 managed by the eNB 200-1. The UE 100-1 is located in Zone 1 that is a geographical area. The UE 100-1 may have established an RRC connection with the eNB 200-1 (Cell 1) (RRC connected state), or may not have established an RRC connection (RRC idle state). The UE 100-1 may establish the RRC connection with the eNB 200-1 if the UE 100-1 transmits a radio signal to the eNB 200-1.

The UE 100-1 is located in Cell 2 managed by the eNB 200-2.

Accordingly, the UE 100-1 can receive the radio signal from the eNB 200-2. The UE 100-1 does not establish the RRC connection with the eNB 200-2.

The UE 100-2 is located (exists) in a cell managed by the eNB 200-2 (Cell 2). The UE 100-2 is located in Zone 2 that is a geographical area. The UE 100-2 may have established an RRC connection with the eNB 200-2 (Cell 2) (RRC connected state), or may not have established an RRC connection (RRC idle state). The UE 100-2 may establish the RRC connection with the eNB 200-2 if the UE 100-2 transmits a radio signal to the eNB 200-2.

The UE 100-1 is a UE controlled by the eNB 200-1. The UE 100-2 is a UE controlled by the eNB 200-2.

As illustrated in FIG. 20, in step S1101, the UE 100-1 transmits an indication to the eNB 200-1. The eNB 200-1 receives the indication.

The indication is, for example, location information indicating the location of the UE 100-1. The location information is, for example, information indicating the location based on a GNSS signal. The location information may be location information specified by another location specification means (for example, GPS). The location information may be zone identification information for identifying a zone in which the UE 100-1 is located (belongs). The zone identification information may be an identifier (zone identifier: Zone ID) indicating a predetermined zone (for example, Zone 1). The zone identification information may be information (an expression, a parameter, and the like) for specifying (calculating) a predetermined zone. The UE 100-1 may report the location information to the eNB 200-1 (network) by a method of reporting the geographical location on the AS (Access Stratum) layer. The AS layer is composed of a physical layer, a MAC layer, an RLC layer, a PDCP layer and an RRC layer.

The indication may be information indicating interest in a specific area (specific zone). The indication may be information indicating interest in the reception (request for reception) of UL data from the UE 100 in the specific area (specific zone). The indication may be information indicating interest in the transmission (request for transmission) of UL data from the UE 100-1.

The UL data is data sent from the network to the UE as multicast data (MBMS data). The UL data is, for example, information to be transmitted to a UE located adjacent to a predetermined UE. The UL data may be, for example, information to be received by a UE located in a predetermined zone. For example, the UL data is a cooperative awareness message (CAM). For example, the UL data may be information indicating at least any one of the current location of the UE 100-1, the moving speed of the UE 100-1, and the movement direction of the UE 100-1. The UL data may include the identifier of the transmission-source UE (for example, the UE ID, the C-RNTI (Cell-Radio Network Temporary Identifier), etc.).

The indication may be a cell identifier (Cell ID) for specifying a cell. The UE 100-1 may transmit, as an indication, a cell identifier received from a cell different from a PCell (Primary Cell) or a serving cell (camp cell) (for example, Cell 2 (that is, the eNB 200-2).

The UE 100-1 may include the above indication in an (extended) MBMS Interest Indication (MBMSInterestIndication) message. For example, as illustrated in FIG. 21, the UE 100-1 can include the Zone ID (ZoneId) as an indication in the MBMS service list (MBMS-ServiceList). If the Zone ID indicates a second zone described later, the Zone ID may be stored in a field indicating the second zone. The MBMS service list may include flag information indicating that the MBMS interest indication Zone ID is the second zone. The eNB 200 can receive the indication by receiving the MBMS interest indication message including the MBMS service list from the UE 100-1.

The MBMS interest indication message is used for notifying the E-UTRAN 10 (the eNB 200-1) that the UE 100-1 is either receiving or is interested in receiving the MBMS, or is no longer receiving or interested in receiving the MBMS. The MBMS service list provides a list of MBMS services that the UE 100-1 is receiving or interested in receiving.

The UE 100-1 may, based on the zone definition information of the eNB 200-2, send an indication. The zone definition information of the eNB 200-2 is information on a geographical area (zone) defined by the eNB 200-2. UE 100-1 may send an indication in response to the location of the UE 100-1 in the second zone defined by eNB 200-2, or the closeness of the UE 100-1 to the second zone. For example, the UE 100-1 may determine to send an indication if the UE 100-1 determines the second zone as a zone of interest. UE 100-1 may decide the zone of interest according to at least any one of the following methods. The following methods may also be combined.

In a first method, the UE 100-1 decides a zone of interest in accordance with the location of the UE 100-1. For example, the UE 100-1 may decide the nearest second zone from the location (current location) of the UE 100-1 as the zone of interest.

In a second method, the UE 100-1 decides a zone of interest in accordance with the moving speed of the UE 100-1. The UE 100-1 may, if the moving speed of the UE 100-1 exceeds the threshold value, decide the second zone as the zone of interest.

In a third method, the UE 100-1 decides a zone of interest in accordance with the movement direction of the UE 100-1. The UE 100-1 may decide the second zone located in the movement direction of the UE 100-1 as the zone of interest.

In a fourth method, the UE 100-1, in response to the distance from the location of the UE 100-1 to the boundary of the zone being less than a threshold value, decides the second zone as the zone of interest. The threshold value may be weighted in accordance with the moving speed of the UE 100-1. For example, the threshold value (x [m]) may be "α [m]–offset value (y [s]× "moving speed of the UE 100-1 [m/s]")".

In a fifth method, the UE 100-1 decides a zone of interest in accordance with the time taken for the UE 100-1 to reach the boundary of the zone (estimated time). For example, the UE 100-1 decides the second zone as the zone of interest in response to the estimated time being less than the threshold value.

In a sixth method, the UE 100-1 decides a zone of interest in response to the second zone being a specific area (a specific zone). For example, the UE 100-1, in response to the reception of area information indicating that the second zone is a specific area (for example, the Zone ID, latitude/longitude information, etc.) from the eNB 200-1 and/or the eNB 200-2, decides the second zone as the zone of interest. The specific area is, for example, an area with a heavy traffic volume, an area where accidents occur, or the like.

The UE 100-1 may, for example, in response to the fulfillment of at least either one of the second method and the fifth method, decide the second zone as the zone of interest.

The UE 100-1 may decide a zone other than the second zone as the zone of interest. For example, the UE 100-1 may decide the zone located in the movement direction of the UE 100-1 as a zone of interest.

The threshold value and/or the area information may be preset (pre-configured) in the UE 100-1. The UE 100-1 may receive the threshold value and/or the area information from the eNB 200-1. The eNB 200-1 may transmit the threshold value and/or the area information to the UE 100-1 by dedicated signaling (for example, an RRC reconfiguration message, DCI and the like) and/or broadcast signaling (for example, SIB (SIB 21 and the like)).

The UE 100-1 may directly receive (acquire) the zone definition information of the eNB 200-2 from the eNB 200-2 (adjacent cell). For example, the UE 100-1 may acquire the zone definition information included in the broadcast signaling by decoding the broadcast signaling (such as SIB and the like) transmitted from the eNB 200-2. The UE 100-1 may transmit the acquired zone definition information to the eNB 200-1.

The UE 100-1 may receive the zone definition information from the eNB 200-1 (PCell or serving cell).

As illustrated in FIG. 22, in step S1150, the eNB 200-1 receives the Zone definition information of the eNB 200-2. The eNB 200-1 may receive the Zone definition information (for example, via the X2 interface) from the eNB 200-2. The eNB 200-2 may, in response to the update of the Zone definition information, send the Zone definition information to the eNB 200-1. The eNB 200-2 may periodically send the Zone definition information to the eNB 200-1. The eNB 200-1 may receive the Zone definition information from an OAM (Operations And Management). That is, the eNB 200-2 may send the Zone definition information to the eNB 200-1 via the OAM. The OAM is a server device managed by an operator. The OAM is configured to perform maintenance and monitoring of the E-UTRAN 10. The OAM is provided in the EPC 20.

In step S1160, the eNB 200-1 transmits the Zone definition information of the eNB 200-2 to the UE 100-1. The eNB 200-1 may transmit the Zone definition information of the eNB 200-2 to the UE 100-1 by dedicated signaling (for example, an RRC reconfiguration message, DCI and the like) and/or broadcast signaling (for example, SIB (SIB 21 and the like)). The eNB 200-1 may transmit the Zone definition information of the eNB 200-2 together with the Zone definition information of the eNB 200-1, to the UE 100-1.

Return to FIG. 20. In step S1102, the eNB 200-1 may determine whether or not to transmit the message in step S1103 to the eNB 200-2 (RRM decision).

The eNB 200-1 may, based on the location information of the UE 100-1 determine to transmit the message. The eNB 200-1 may, as in the UE 100 described above, determine to transmit the message in response to the UE 100-1 being located in the second zone, or being close to the second zone. The eNB 200-1 may, in response to the UE 100-1 not being located in the second zone, or being far from the second zone, stop the transmission of the message.

The eNB 200-1 may, based on the information indicating an interest in the specific area (specific zone), determine to transmit the message.

The eNB 200-1 may, based on the indication from the UE 100-1, decide the transmission destination of the message.

In step S1103, the eNB 200-1 sends a request message (request) message to the eNB 200-2. The request message is a message requesting multicasting of the UL data from the UE (the UE 100-2) to a specific area (specific zone) by the eNB 200-2. The request message may be a message requesting (the preparation of) a resource for the multicast operation (for the UE 100-1). The request message may be a message requesting the allocation of a resource for the multicast operation (for the UE 100-1). The request message may be a message requesting the allocation of identification information (for example, the TMGI) for identifying multicast data described later.

The request message may include an indication received from the UE 100-1. For example, the request message may include the location information of the UE 100-1 received from the UE 100-1 in step S1101. The location information may be an identifier (zone identifier: Zone ID) of a zone in which the UE 100-1 is currently located (belongs to). The request message may include the zone definition information of the eNB 200-1.

In step S104, the eNB 200-2 may determine whether or not the eNB 200-2 approves a request from the eNB 200-1. The eNB 200-2 may make the determination based on the location information of the UE 100-1. For example, the eNB 200-2 may, if another UE 100 exists in the zone in which the UE 100-1 is located, determine to approve the request from the eNB 200-1. Otherwise, the eNB 200-2 may determine to reject the request from the eNB 200-1.

The eNB 200-2 may execute a (radio) admission control (Radio Admission Control). The admission control is to approve or reject an establishment request for a new radio bearer.

In step S1105, the eNB 200-2 sends a response message (response) to the request message, to the eNB 200-1.

The acknowledgment response message (ACK) may include information about the resource (SC-PTM resource config.) allocated by the eNB 200-2 for the transmission of multi-carrier data.

The information about the resource may include information about the time and/or the frequency resource. The information about the resource may include identification information for identifying the multicast data (that is, the MBMS (MBMS data, MBMS packet, content, etc.)). The identification information is, for example, a TMGI (Temporary Mobile Group Identity). The TMGI is an identifier associated with multicast data (that is, the MBMS (MBMS data, MBMS packet, contents, etc.)). The identification information may be a group identifier associated with the TMGI (for example, a G-RNTI (Group-Radio Network Temporary Identifier)). The G-RNTI is an RNTI for identification of a multicast group (for example, an SC-MTCH addressed to a specific group). The G-RNTI is mapped one-to-one with the TMGI. TMGI will be described below as an example of identification information.

The acknowledgment response message may include address information indicating the transfer destination of the UL data. The address information is, for example, an identifier of a tunneling layer (TEID: Tunnel Endpoint ID). The TEID is used in generation of a logical communication route through which user plane data (PDCP PDU) is transferred, and is an identifier indicating the communication route. The address information may be an identifier of the eNB 200-2. The acknowledgment response message may include a zone identifier for transmitting multicast data.

The rejection response message (NACK) may include the reason for rejection. The eNB 200-1 may terminate the process in response to the reception of the rejection response message. Alternatively, the eNB 200-1 may execute an operation pattern described later.

In the description below, it is assumed that the eNB 200-2 sends an acknowledgment response message to the eNB 200-1.

In step S1106, the eNB 200-1 may change the SC-MCCH (that is, the MBMS control information). The eNB 200-1 can include information about the resource received from the eNB 200-2 in the MBMS control information.

The MBMS control information may include the mapping information. In the mapping information, the zone identification information of the eNB 200-1 (for example, the Zone ID), and the information about the resource of the eNB 200-2 (for example, the TMGI) may be mapped (may be associated). The information about the resource may include the mapping information.

The MBMS control information may include information indicating the receiving destination of the information about the resource of the eNB 200-2. The information may be an identifier of the UE 100-1 (for example, the C-RNTI). The information may be a G-RNTI.

The MBMS control information may include information about the resource allocated by the eNB 200-1 for the transmission of multi-carrier data.

The eNB 200-1 may, if the eNB 200-1 is not transmitting the SC-MCCH, start the transmission of the SC-MCCH (MBMS control information).

In step S1107, the eNB 200-1 transmits the MBMS control information via the SC-MCCH. As a result, the eNB 200-1 transmits the information about the resource of the eNB 200-2 to the UE 100-1. The UE 100-1 receives the MBMS control information.

In step S1108, the UE 100-2 transmits the UL data (by unicast) to the eNB 200-2. The eNB 200-2, for transmitting the UL data as multicast data (MBMS data), for example, transfers the UL data to the MBMS GW 21. The MBMS GW 21 may perform transfer to an NW apparatus (for example, the BMSC 22) configured to map (associate) the UL data with the TMGI.

In step S1109, the MBMS GW 21 receives the DL data as multicast data (MBMS). The MBMS GW 21 may send the DL data to the eNB 200-2.

The eNB 200-2 may receive, from the MBMS GW 21, the DL data including the UL data from the UE 100-2. The eNB 200-2 may receive, from the eNB 200-1, the DL data including the UL data from the UE 100-2.

The eNB 200-2 transmits the DL data received from the MBMS GW 21 (and/or the eNB 200-1) as multicast data. That is, the eNB 200-2 multicasts the DL data (MBMS data) to a specific area. For example, the eNB 200-2 may transmit the multicast data via the SC-MTCH by SC-PTM transmission.

Specifically, the eNB 200-2 may, upon determining that the UL data of the UE 100-2 is the data to be transmitted to the UE 100-1, transmit the DL data as multicast data corresponding to the TMGI allocated to the UE 100-1. That is, the eNB 200-2 may multicast the DL data including the UL data of the UE 100-2 to the zone to which the UE 100-1 belongs. The eNB 200-2 may determine whether it is necessary to transmit the DL data to the zone to which the UE 100-1 belongs based on the location information (zone identification information and the like) of the UE 100-2.

The MBMS GW 21 may send the DL data (MBMS) to the eNB 200-1.

The eNB 200-1 may receive, from the MBMS GW 21, the DL data including the UL data from the UE 100-2. The eNB 200-1 may, upon receiving the DL data corresponding to the TMGI allocated to the UE 100-1 by the eNB 200-2, transfer the DL data to the eNB 200-2 based on the address information. The eNB 200-2 may transmit the DL data (MBMS) transferred from the eNB 200-1 as multicast data corresponding to the TMGI allocated to the UE 100-1.

The eNB 200-2 may transmit the DL data including the UL data of the UE 100-2 as multicast data to the zone in which the UE 100-2 is located. The eNB 200-2 may transmit the DL data as multicast data corresponding to the TMGI associated with the zone in which the UE 100-2 is located (belongs to).

In the physical layer, each eNB 200, after transmitting the PDCCH by using the G-RNTI, transmits the multicast data via the PDSCH.

The UE 100-1 receives the multicast data based on the information about the resource allocated by the eNB 200-2. The UE 100-1 may receive the multicast data associated with the TMGI based on the mapping information in which the specific zone and the TMGI are associated with each other. As a result, only the UE 100 located in the specific area (specific zone) can receive the multicast data (DL data). Accordingly, the DL data is transmitted to the specific area (specific zone).

The UE 100-1 is configured to perform PDCCH monitoring according to the setting for each TMGI. If the PDCCH can be decoded by the G-RNTI associated with the TMGI, it is possible to receive the multicast data transmitted via the PDSCH according to the PDCCH.

The multicast data (DL data) may, for example, include each UL data from a plurality of UEs existing in the same zone. That is, the UL data may be aggregated (multiplexed) in the multicast data. The UL data included in the DL data may be associated with (or may include) the identifier of the transmission-source UE (UE 100-1). For example, if the UE 100-2 is receiving multicast data based on the same TMGI as the UE 100-1, the UE 100-2 can discard (ignore) the UL data of the UE 100-2 included in the received multicast data (DL data).

As described above, the UE 100-1 can receive the UL data from the UE 100-2 controlled by an adjacent eNB (that is, the eNB 200-2) different from the serving eNB (that is, the eNB 200-1) as multicast data. As a result, the UE 100-1 can appropriately perform control related to the movement based on the multicast data from the eNB 200-2.

The UE 100-1 may receive the UL data from the UE controlled by the eNB 200-1 as multicast data. The UE 100-1 may receive the multicast data based on the mapping information in which the identification information (the TMGI) and the zone are associated with each other. Specifically, the UE 100-1 may receive the multicast data from the eNB 200-1 based on the TMGI associated with the zone (specific zone) in which the UE 100-1 is located. The multicast data can include the UL data from other UEs in the zone in which the UE 100-1 is located. As a result, the UE 100-1 may only receive the multicast data associated with the zone in which the UE 100-1 is located, and therefore, it is possible to reduce the processing load (the load of reception and the load of movement control).

Since each UE 100 that is the transmission destination of multicast data is located in the same zone, it is assumed that variations in the reception signal quality of the multicast data are less. Therefore, each eNB 200-2 can perform appropriate scheduling by selecting an optimum modulation scheme (MCS) or the like for each UE 100 located in the same zone.

(B) Operation Pattern 2

Figure 23:
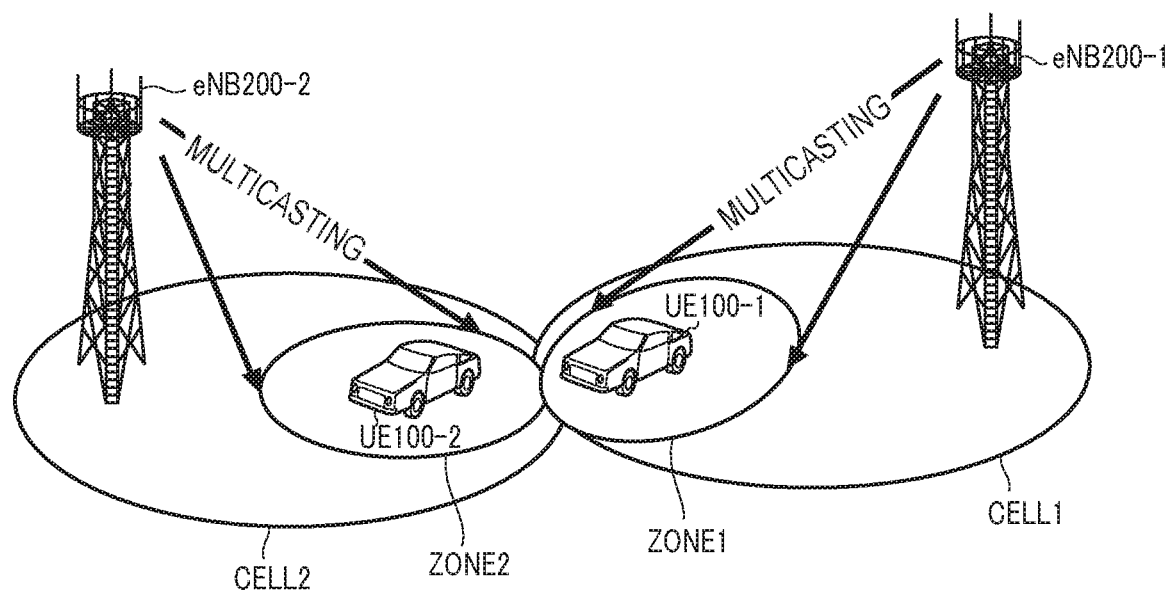
FIG. 23 is a diagram for describing an operation environment of operation pattern 2 according to the second embodiment.
Figure 24:
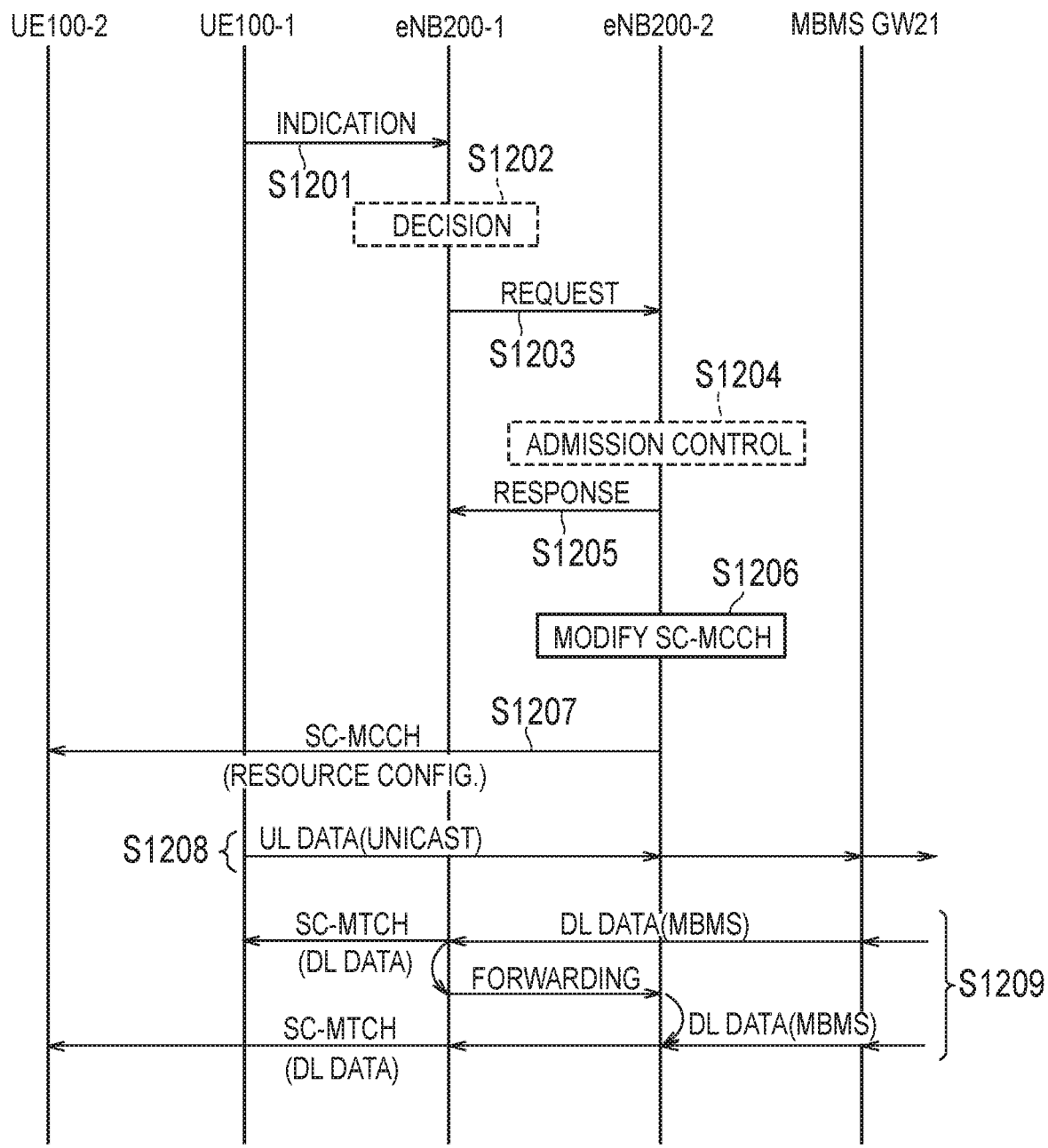
FIG. 24 is a sequence chart for describing an operation pattern 2 according to the second embodiment.

Operation pattern 2 will be described with reference to FIG. 23 and FIG. 24. FIG. 23 is a diagram for describing an operation environment of operation pattern 2. FIG. 24 is a sequence chart for describing operation pattern 2. The description of content similar to the content described above will be omitted.

Operation pattern 1 is a case in which the UE 100-1 receives the UL data of the UE 100-2. Operation pattern 2 is a case in which the UE 100-2 receives the UL data of the UE 100-1.

As illustrated in FIG. 23, the UE 100-1 is not located in Cell 2 managed by the eNB 200-2. Accordingly, the UE 100-1 cannot receive the radio signal from the eNB 200-2. Operation pattern 2 may have an environment similar to that in operation pattern 1 (FIG. 19).

In FIG. 24, steps S1201 and S1202 correspond to steps S1101 and S1102.

In step S1203, the eNB 200-1 sends a request message (request) message to the eNB 200-2. The request message is a message requesting multicasting of the UL data from the UE (the UE 100-1) to a specific area (specific zone) by the eNB 200-2. The request message may be a message requesting (the preparation of) a resource for the multicast operation (for the UE 100-2 controlled by the eNB 200-2). The request message may be a message requesting the allocation of a resource for the multicast operation for the UE 100-2 controlled by the eNB 200-2. The request message may be a message requesting the allocation of identification information (for example, the TMGI).

The request message may include an indication received from the UE 100-1. For example, the request message may include the location information of the UE 100-1 received from the UE 100-1 in step S1201.

Steps S1204 and S1205 correspond to steps S1104 and S1105.

The acknowledgment response message, unlike step S1105, does not include information about the resource. If operation pattern 2 is combined with operation pattern 1, the message may be common with the acknowledgment response message. That is, the acknowledgment response message, unlike step S1105, may include information about the resource.

In step S1206, the eNB 200-2 may change the SC-MCCH (that is, the MBMS control information). For example, since the eNB 200-2 also multicasts the UL data from the UE (UE 100-1) not controlled by the eNB 200-2, a radio resource for receiving the multicast data may be added. A TMGI for receiving the UL data from the UE 100-1 may be added to the MBMS control information. The TMGI may be a TMGI already included in the MBMS control information. The TMGI may be associated with the zone in which the UE 100-1 is located (and/or an adjacent zone). The MBMS control information may include mapping information indicating the association.

In step S1207, the eNB 200-2 may transmit the MBMS control information (changed) via the SC-MCCH.

In step S1208, the UE 100-1 transmits the UL data (by unicast) to the eNB 200-1. The eNB 200-1, similarly to the eNB 200-2, transfers the UL data to the MBMS GW 21.

In step S1209, the MBMS GW 21 receives the DL data as multicast data (MBMS). The MBMS GW 21 may send the DL data to each of the eNB 200-1 and the eNB 200-2.

The eNB 200-1 may receive, from the MBMS GW 21, the DL data including the UL data from the UE 100-1. The eNB 200-1 may, upon receiving the DL data including the UL data from the UE 100-1, transfer the DL data to the eNB 200-2 based on the address information.

The eNB 200-2 may receive, from the MBMS GW 21, the DL data including the UL data from the UE 100-1. The eNB 200-2 may receive, from the eNB 200-1, the DL data including the UL data from the UE 100-1.

The eNB 200-2 transmits the DL data received from the MBMS GW 21 (and/or the eNB 200-1) as multicast data.

The eNB 200-2 may, if the DL data includes the UL data of the UE 100-1, transmit the DL data as multicast data corresponding to the TMGI in step S1206.

The UE 100-2 can receive the multicast data based on the MBMS control information in step S1207. The UE 100-2 can, for example, receive the multicast data based on the TMGI associated with the zone (specific zone) in which the UE 100-2 is located. As a result, the load on the UE 100-2 can be reduced.

As described above, the UE 100-2 can receive the UL data from the UE 100-1 controlled by an adjacent eNB (that is, the eNB 200-1) different from the serving eNB (that is, the eNB 200-2) as multicast data. As a result, the UE 100-2 can appropriately perform control related to the movement based on the multicast data from the eNB 200-2. The processing load of the UE 100-2 can be reduced.

(C) Operation Pattern 3

Figure 25:
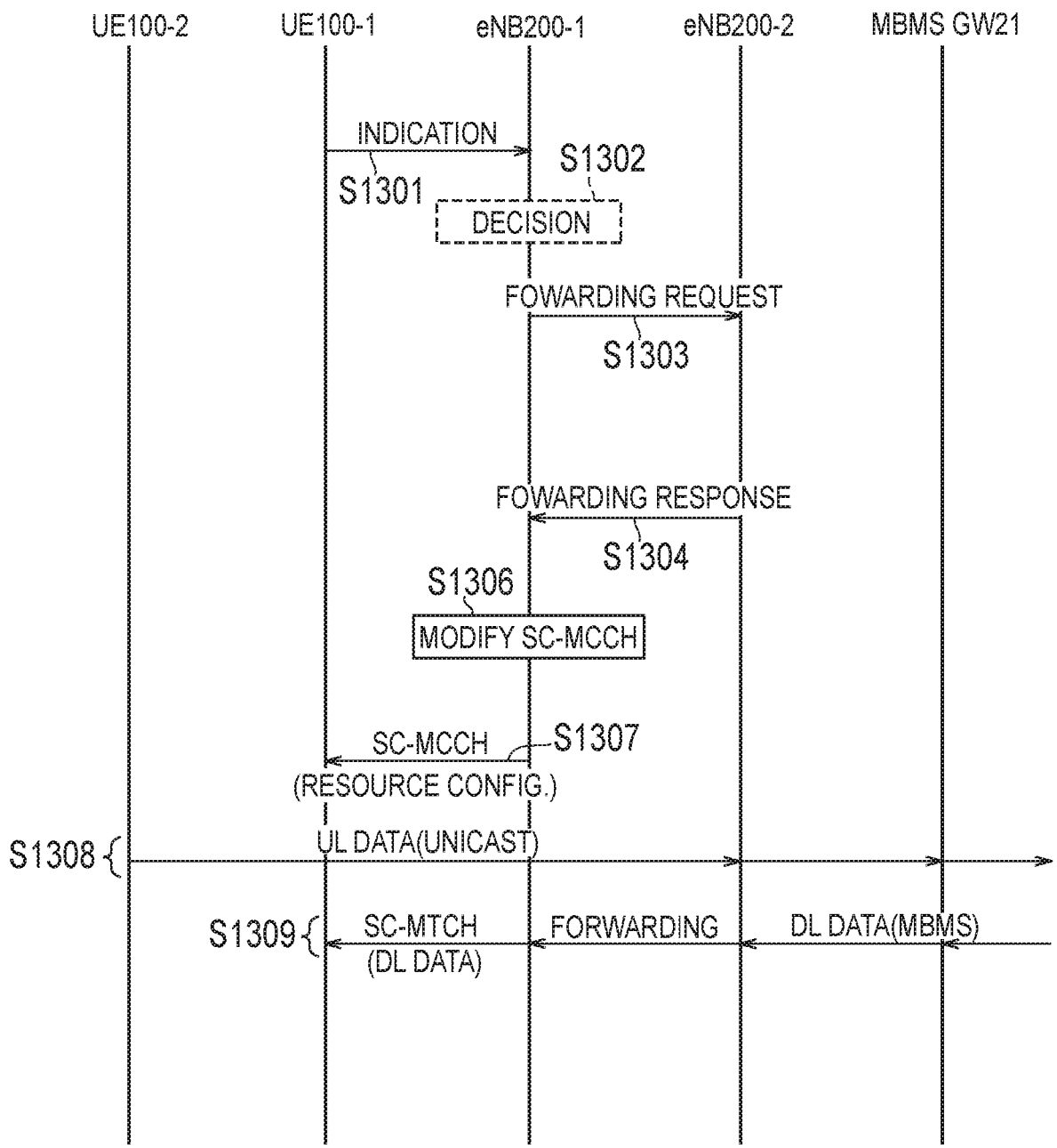
FIG. 25 is a sequence chart for describing an operation pattern 3 according to the second embodiment.

Operation pattern 3 will be described with reference to FIG. 25. FIG. 25 is a sequence chart for describing operation pattern 3. The description of content similar to the content described above will be omitted.

Operation pattern 1 is a case in which the eNB 200-2 (adjacent eNB) sends the UL data of the UE 100-2 to the UE 100-1. Operation pattern 3 is a case in which the eNB 200-1 (serving eNB) sends the UL data of the UE 100-2 to the UE 100-1. Operation pattern 3 has an environment similar to that in operation pattern 2 (FIG. 19 or FIG. 23).

In FIG. 25, steps S1301 and S1302 correspond to steps S1101 and S1102.

In step S1303, the eNB 200-1 sends a transfer request message (forwarding request) to the eNB 200-2. The transfer request message is a message requesting the transfer of the UL data from the UE 100 controlled by another eNB 200.

The transfer request message may be the request message described above.

The transfer request message may include the address information described above. The transfer request message may include transfer identification information for identifying the multicast data (MBMS) to be transferred. The transfer identification information may be an indication (for example, location information) from the UE 100-1.

In step S1304, the eNB 200-2 sends a response message (forwarding response) to the transfer request message. The response message may be the response message described above.

In steps S1306 and S1307, the eNB 200-1 performs an operation similar to that in the eNB 200-2 in steps S1206 and S207. The eNB 200-1 may include the mapping information indicating the association between the zone in which the UE receiving the DL data from the UE 100-2 is located and the TMGI, in the MBMS control information. Step S1308 corresponds to step S1108.

In step S1309, the MBMS GW 21 receives the DL data as multicast data (MBMS). The MBMS GW 21 sends the DL data to the eNB 200-2. The eNB 200-2 receives the DL data.

The eNB 200-2 transfers the DL data to the eNB 200-1. The eNB 200-2 may, based on the transfer identification information, send the DL data including the UL data of the UE 100-2 to the eNB 200-1. The eNB 200-2 may send, to the eNB 200-1, the DL data including the UL data from the other UEs located in the same zone as the UE 100-2.

The eNB 200-1 multicasts the DL data (MBMS data) to a specific area. Specifically, the eNB 200-1 transmits the DL data (MBMS) received from the eNB 200-2 as multicast data.

The UE 100-1 can receive the multicast data based on the MBMS control information in step S1307. The UE 100-1 can, for example, receive the multicast data based on the TMGI associated with the zone in which the UE 100-1 is located.

As described above, the UE 100-1 can receive the UL data from the UE 100-2 controlled by an adjacent eNB (that is, the eNB 200-2) different from the serving eNB (that is, the eNB 200-1) as multicast data. As a result, the UE 100-2 can appropriately perform control related to the movement based on the multicast data from the eNB 200-2. The processing load of the UE 100-1 can be reduced.

(D) Operation Pattern 4

Figure 26:
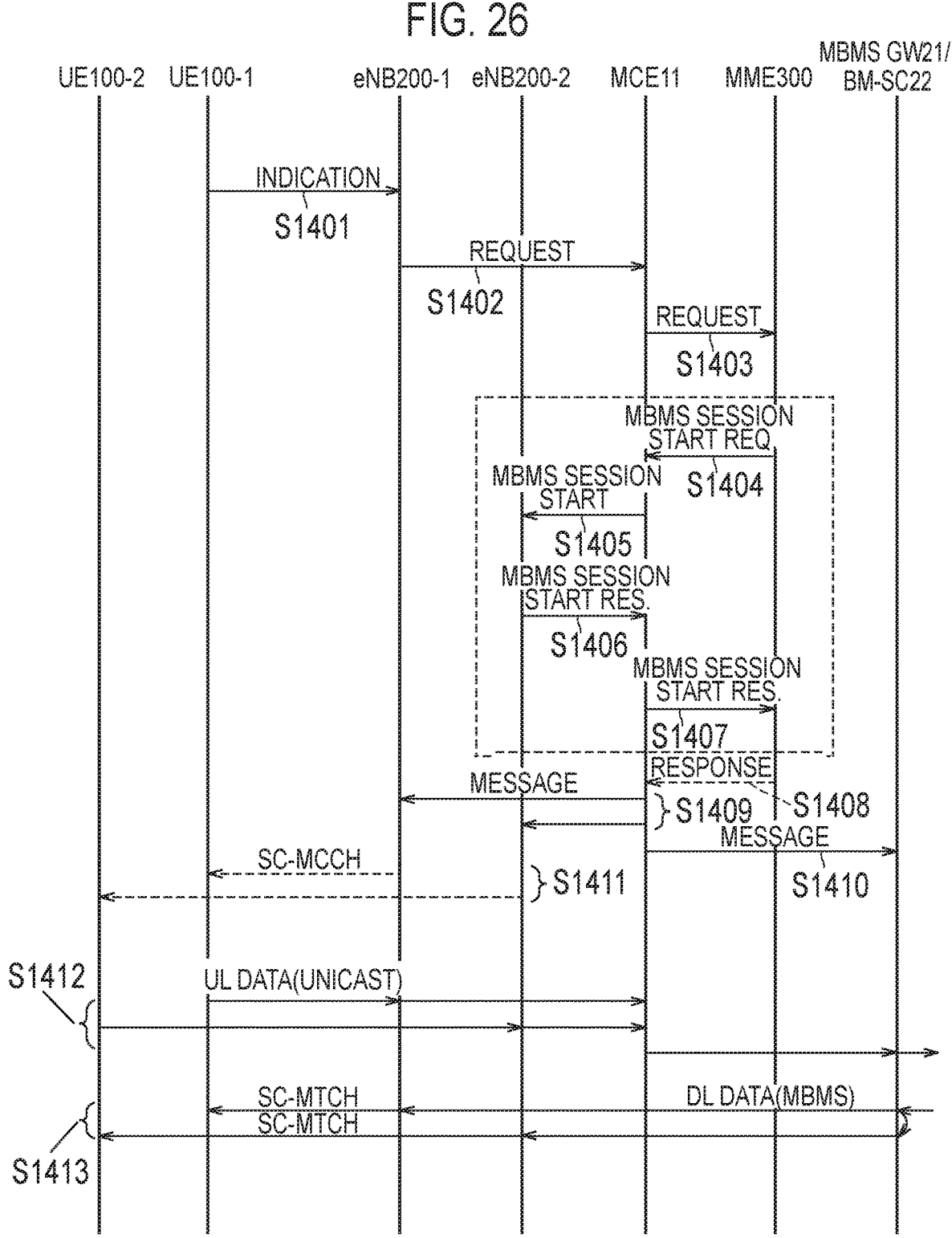
FIG. 26 is a sequence chart for describing an operation pattern 4 according to the second embodiment.

Operation pattern 4 will be described with reference to FIG. 26. FIG. 26 is a sequence chart for describing operation pattern 4. The description of content similar to the content described above will be omitted.

Operation pattern 4 is a case in which an upper node transfers multicast data. Operation pattern 4 has an environment similar to that in operation pattern 2 (FIG. 19 or FIG. 23).

In FIG. 26, step S1401 corresponds to step S1101.

In step S1402, the eNB 200-1 sends a request message (request) to the MCE 11. The request message may be a message having the same content as the request message described above. The request message may be a message having the same content as the transfer request message described above.

The request message may include the identification information for specifying the eNB 200-2. The identification information is, for example, at least any one of an identifier of the eNB 200-2, a cell ID, location information of the UE 100-1, and an indication from the UE 100-1 (for example, the location information, zone identification information and the like).

In step S1403, the MCE 11 sends a request message (request) to the MME 300.

The request message is, for example, a message requesting the start of multicast by the eNB 200-2. The request message may be a message having the same content as the request message in step S1402. The MCE 11 may transfer the request message in step S1402. The MCE 11 may generate a request message.

The MME 300 receives the request message from the MCE 11. The MME 300 may specify the eNB 200-2 to which the message in step S1405 should be transmitted. The MME 300 may specify the eNB 200-2 based on the information included in the request message. The MME 300 may specify the eNB 200-2 based on the transmission source of the request message in step S1402. For example, the MME 300 may specify an adjacent eNB of the transmission-source eNB 200-1 as the transmission destination of the message in step S1404.

If the transmission destination of the message in step S1405 (eNB 200-2) is already executing an MBMS session, the process in step S1404 to S1407 may be omitted. That is, the MME 300 may omit the process in step S1404. The MME 300 may, in step S1405, send a message for instructing a session change instead of the message below.

In step S1404, the MME 300 sends, to the MCE 11, a message requesting the start of an MBMS session (MBMS Session Start Req.). The MME 300 may include the identifier of the eNB 200-2 specified as the transmission destination in the message.

MME 300 may transmit a response message denying the request in step S1403 (NACK). The MME 300 may, for example, transmit a response message (NACK) in response to an MBMS session being already executed by the eNB 200-2. The response message (NACK) may include information indicating the reason for rejection. The MCE 11 may, if the reason for rejection is that the eNB 200-2 is already executing an MBMS session, execute the process in step S1405.

In step S1405, the MCE 11 sends a message for starting the MBMS session (MBMS Session start) to the eNB 200-2.

In step S1406, the eNB 200-2 sends, to the MCE 11, a response message to the message in step S1405 (MBMS Session start Res.).

In step S1407, the MCE 11 sends, to the MME 300, a response message to the message in step S1404 (MBMS Session start Res.).

In step S1408, the MME 300 may send a response message (response) to the message in step S1403. The MME 300 may, if the process from step S1404 to S1407 is to be omitted, send a response message. The MME 300 may, if the transmission destination of the message in step S1405 is already executing an MBMS session, send a response message for instructing a session change. The response message may include information about the resource for multicast operation.

In step S1409, the MCE 11 sends a message to the eNB 200-1 and/or the eNB 200-2. The message may include information about the resource. The information about the resource may be information about the resource allocated by the MCE 11 for multicast operation. The information about the resource may be the information about the resource in step S1408. The contents of the information about the resource are similar to those of the information about the resource described above.

In step S1410, MME 300 may send a transfer request message to a node (for example, an NW apparatus 500 such as the MBMS GW 21 or the BM-SC 22) configured to distribute the multicast data to each eNB 200.

The transfer request message is a message requesting the transfer of multicast data. The transfer request message may include transfer identification information for identifying the multicast data (MBMS) to be transferred. The transfer identification information may be an indication (for example, location information) from the UE 100-1.

The MCE 11 may send the message via the MME 300.

Steps S1411 to S1413 have contents similar to those in each operation pattern described above.

In step S1413, the NW apparatus 500 may, based on the transfer identification information, for example, transfer the DL data (MBMS) including the UL data from the UE 100-1 to the eNB 200-2. The NW apparatus 500 may send the same DL data to the eNB 200-1. Similarly, the NW apparatus 500 may, based on the transfer identification information, for example, transfer the DL data (MBMS) including the UL data from the UE 100-2 to the eNB 200-1. The NW apparatus 500 may send the same DL data to the eNB 200-2.

As described above, even if an interface is not established between the eNBs, each eNB 200 can receive multicast data including the UL data of the UE 100 controlled by a different eNB 200 since an upper node with respect to the eNB 200 transfers the multicast data (MBMS).

(E) Operation Pattern 5

Figure 27:
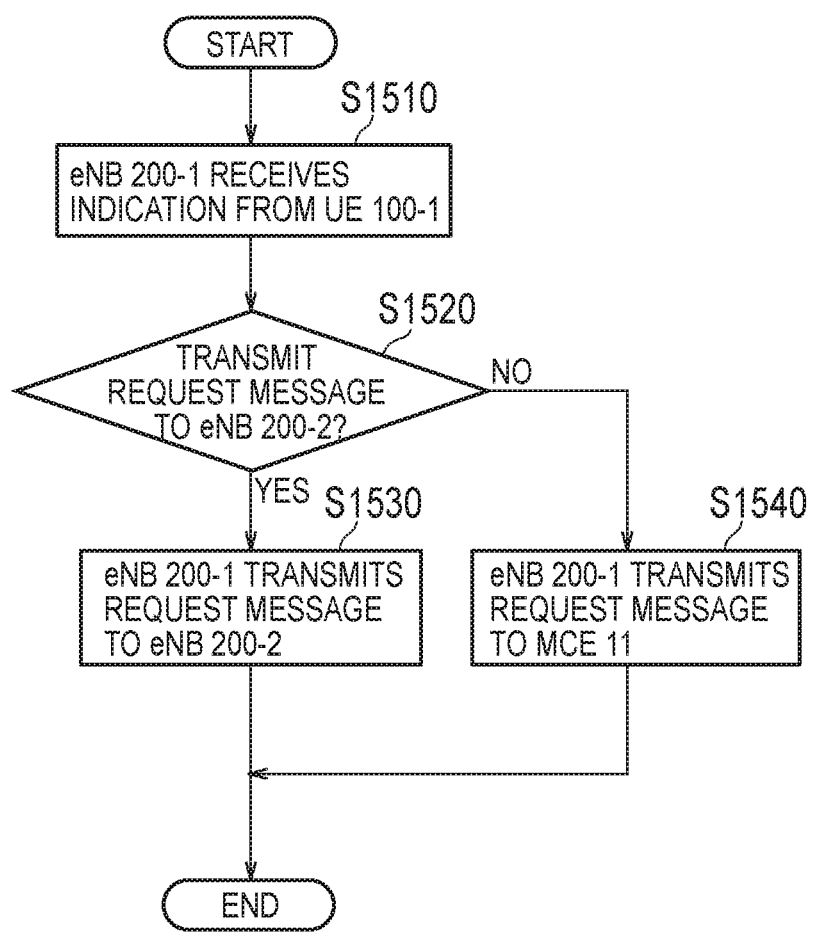
FIG. 27 is a flowchart for describing an operation pattern 5 according to the second embodiment.

Operation pattern 5 will be described with reference to FIG. 27. FIG. 27 is a flowchart for describing operation pattern 5.

In operation pattern 5, the eNB 200-1 determines whether to send the request message to the eNB 200-2 or to the MCE 11. That is, the eNB 200-1 determines whether to perform the operation of operation patterns 1 to 3, or whether or not to perform the operation of operation pattern 4.

As illustrated in FIG. 27, in step S1510, the eNB 200-1 receives an indication from the UE 100-1. The eNB 200-1 may, in response to the reception of the indication from the UE 100-1, perform the process in step S1520.

The eNB 200-1 may, as in step S1102, determine whether or not to transmit a request message (RRM decision). The request message may be a transfer request message (see S303). The eNB 200-1 may, in response to the determination that the request message is to be transmitted, perform the process in step S1520. The eNB 200-1 may, in response to the determination that the request message is not to be transmitted, terminate the process.

In step S1520, the eNB 200-1 determines whether or not the eNB 200-1 is to send a request message to the eNB 200-2. The eNB 200-1, in response to the determination that a request message is to be sent to the eNB 200-2, performs the process in step S1530. That is, the eNB 200-1 performs the process of operation pattern 1-3. The eNB 200-1, in response to the determination that a request message is to be sent to the MCE 11, performs the process in step S1540. That is, the eNB 200-1 performs the process of operation pattern 4.

For example, the eNB 200-1 may, in response to the establishment of an interface (X2 interface) with the eNB 200-2, perform the process in step S1530. The eNB 200-1 may, in response to the non-establishment of an interface (X2 interface) with the eNB 200-2, perform the process in step S1540.

The eNB 200-1 may, in response to the UE 100-1 being located at the cell edge, perform the process in step S1530. For example, the eNB 200-1 may make a determination based on the measurement report used in the determination of the location information and/or the handover from the UE 100-1. The eNB 200-1 may, in response to the UE 100-1 not being located at the cell edge, perform the process in step S1540. The eNB 200-1 may, in response to the decision of a handover of the UE 100-1, perform the process in step S1530. In this case, the eNB 200-2 is the target eNB that is the handover destination of the UE 100. The eNB 200-1 may include the information about the resource in the handover command to the UE 100-1.

If the eNB 200-1 determines to perform the process in step S1530 in response to the UE 100-1 being located at the cell edge, the eNB 200-1 may determine to perform the process of operation pattern 1. The eNB 200-1 may, if the UE 100-1 is not located at the cell edge, determine to perform the process of operation pattern 2 or 3.

In step S1530, the eNB 200-1 sends a request message to the eNB 200-2.

In step S1540, the eNB 200-1 sends a request message to the MCE 11.

As described above, the eNB 200 can appropriately determine the transmission destination of the request message.

OTHER EMBODIMENTS

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the description above, an example of transmission of multicast data (UL data) by SC-PTM transmission was cited, but the multicast data (UL data) may be transmitted by MBSFN transmission. For example, in the description above, the eNB 200 may use the MCCH instead of the SC-MCCH. The eNB 200 may use the MTCH instead of the SC-MTCH.

Multicast data (UL data) may be transmitted by a multicast data transmission method other than SC-PTM transmission or MBSFN transmission.

In the description above, data routing (that is, the path (UL->DL) of the UL data) may be performed only via the eNB 200. The UL data may pass through the EPC 20 (for example, at least any one of the MBMS GW 21, the SGW 400, and the PGW 23). The UL data may pass through the GCS AS 31.

In the description above, the NW apparatus 500 decides the corresponding relationship between the TMGI and the Zone ID (the first corresponding relationship), and the corresponding relationship between the TMGI and the UL data (multicast data) (the second corresponding relationship). That is, the NW apparatus 500 performed the mapping between the TMGI and the Zone ID (the first mapping), and the mapping between the TMGI and the UL data (multicast data) (the second mapping). However, the nodes on which the first mapping and the second mapping are performed may be different.

For example, the eNB 200 may perform the second mapping, and an upper NW apparatus 500 of the eNB 200 may perform the first mapping. In this case, the eNB 200 can omit the transmission of the UL data to the NW apparatus 500. The eNB 200 can, upon receiving the first mapping information once, omit the transmission of the UL data to the NW apparatus 500 as long as the first mapping information is not updated. The eNB 200 may, instead of sending the UL data to the NW apparatus 500, send the UL data to an upper node performing the second mapping. The first mapping information is transferred from the eNB 200 and/or the NW apparatus 500 performing the first mapping to the upper node.

In the description above, the eNB 200-1 transmits the request message in response to the indication from the UE 100-1, however, the present invention is not limited hereto. The eNB 200-1 may, in response to the indication from the UE 100-1, send a message for terminating each operation pattern to the eNB 200-2 and/or the upper node (the NW apparatus 500). As a result, it is possible to reduce the reception of information that the UE 100 does not require.

The operation (each operation pattern) according to each of the embodiments described above may be combined to be executed, where appropriate. The operation according to the first embodiment and the operation according to the second embodiment may be combined. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any of the above-described nodes (such as the UE 100, the eNB 200, the NW apparatus 500 and the like) may be provided. The program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, for example, a recording medium such as a CD-ROM and a DVD-ROM.

A chip may be provided which includes: a memory for storing a program for executing each process performed by any of the UE 100, the eNB 200, and the NW apparatus 500; and a processor for executing the program stored in the memory.

In each of the above-described embodiments, an LTE system is described as an example of the mobile communication system; however, the LTE system is not an exclusive example, and the content according to the present application may be applied to a system other than the LTE system.

The entire content of Japanese Patent Application No. 2016-157797 (filed on Aug. 10, 2016) and Japanese Patent Application No. 2016-157809 (filed on Aug. 10, 2016) is incorporated in the present specification by reference.

The invention claimed is:

1. A communication apparatus, comprising:
a receiver configured to
receive predetermined information from a base station, the predetermined information indicating a corresponding relationship between identification information for identifying multicast data and area identification information for identifying a geographical area; and
receive, based on the predetermined information, predetermined multicast data from the base station, the predetermined multicast data including data from another communication apparatus in a first area in which the communication apparatus is located, and
a transmitter configured to transmit first information to the base station, in response to a fulfillment of a transmission condition of the first information, wherein
the first information is a request to have the base station transmit the predetermined multicast data including data from another communication apparatus in a second area different from the first area, and
the transmission condition is based on at least any one of the following: a distance from a location of the communication apparatus to a boundary of the first area, a time taken for the communication apparatus to reach the boundary of the first area, and the second area being a specific area.

2. The communication apparatus according to claim 1, the communication apparatus further comprising a controller configured to
specify predetermined area identification information for identifying the first area; and
specify, based on the predetermined information, predetermined identification information associated with the predetermined area identification information,
wherein the receiver receives the predetermined multicast data based on the predetermined identification information.

3. The communication apparatus according to claim 1, wherein
the predetermined multicast data includes data from a third communication apparatus in an area different from the first area.

4. The communication apparatus according to claim 1, the first information being a request to have the base station transmit multicast data including data from the communication apparatus in an area different from the first area.

5. The communication apparatus according to claim 4, wherein
the transmitter is further configured to transmit second information to the base station, the second information indicating that there is no need to transmit the multicast data including the data from the communication apparatus in the second area.

6. The communication apparatus according to claim 1, further comprising a controller configured to determine the second area, wherein the second area is determined in accordance with at least any one of the following: a position of the communication apparatus, a moving speed of the communication apparatus, and a movement direction of the communication apparatus.

7. The communication apparatus according to claim 1, wherein
the transmitter is configured to transmit second information to the base station,
the second information indicating that there is no need to transmit the predetermined multicast data including the data from the another communication apparatus.

8. The communication apparatus according to claim 1, wherein
the receiver is further configured to receive definition information for defining the area identification information from the base station, and
the communication apparatus further comprises a transmitter configured to notify the definition information to a network apparatus configured to determine at least one of a first corresponding relationship and a second corresponding relationship, wherein
the first corresponding relationship is a corresponding relationship between the identification information and the area identification information, and
the second corresponding relationship is a corresponding relationship between the identification information and data to be transmitted as the multicast data.

9. A base station, comprising:
a transmitter configured to
transmit predetermined information to a first communication apparatus, the predetermined information indicating a corresponding relationship between identification information for identifying multicast data and area identification information for identifying a geographical area; and
transmit predetermined multicast data based on the predetermined information, and
a receiver configured to receive first information from the first communication apparatus, wherein
the first information is a request for the base station to transmit the predetermined multicast data including data from another communication apparatus in a second area different from a first area in which the first communication apparatus is located, and
the transmitter is further configured to transmit, to the first communication apparatus, a transmission condition of the first information for the first communication apparatus,
the transmission condition being a condition based on at least any one of the following: a distance from a location of the communication apparatus to a boundary of the first area, a time taken for the communication apparatus to reach the boundary of the first area, and the second area being a specific area.

10. The base station according to claim 9, further comprising:
a receiver configured to receive data from a second communication apparatus, wherein
the predetermined multicast data includes data from the second communication apparatus and is identified by predetermined identification information, further wherein the predetermined identification information is associated with predetermined area identification information for identifying an area in which the second communication apparatus is located.

11. The base station according to claim 9, wherein the first information is a request for the base station to transmit multicast data including data from the first communication apparatus in an area different from the first area in which the first communication apparatus is located.

12. The base station according to claim 9, further comprising
a controller configured to notify definition information for defining the area identification information to a network apparatus configured to determine at least one of a first corresponding relationship and a second corresponding relationship, wherein
the first corresponding relationship is a corresponding relationship between the identification information and the area identification information, and
the second corresponding relationship is a corresponding relationship between the identification information and data to be transmitted as the multicast data.

* * * * *